United States Patent
Fukutomi et al.

(10) Patent No.: US 10,659,738 B2
(45) Date of Patent: May 19, 2020

(54) IMAGE PROCESSING APPARATUS, IMAGE PROCESSING METHOD, AND IMAGE PROCESSING PROGRAM PRODUCT

(71) Applicant: OLYMPUS CORPORATION, Hachioji-shi, Tokyo (JP)

(72) Inventors: Takeshi Fukutomi, Tokyo (JP); Ayako Asakura, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 299 days.

(21) Appl. No.: 15/804,752

(22) Filed: Nov. 6, 2017

(65) Prior Publication Data

US 2018/0077392 A1    Mar. 15, 2018

Related U.S. Application Data

(63) Continuation of application No. PCT/JP2015/063540, filed on May 12, 2015.

(51) Int. Cl.
H04N 9/04    (2006.01)
H04N 9/64    (2006.01)

(52) U.S. Cl.
CPC .............. H04N 9/045 (2013.01); H04N 9/646 (2013.01)

(58) Field of Classification Search
None
See application file for complete search history.

(56) References Cited

U.S. PATENT DOCUMENTS

| | | |
|---|---|---|
| 2007/0103564 A1 | 5/2007 | Chiba |
| 2007/0153341 A1 | 7/2007 | Kang |
| 2009/0074324 A1 | 3/2009 | Ishiga et al. |
| 2009/0268051 A1 | 10/2009 | Utsugi |

(Continued)

FOREIGN PATENT DOCUMENTS

| | | |
|---|---|---|
| EP | 2490174 A2 | 8/2012 |
| JP | 2009267690 A | 11/2009 |

(Continued)

OTHER PUBLICATIONS

International Search Report (ISR) and Written Opinion dated Jul. 21, 2015 issued in International Application No. PCT/JP2015/063540.

(Continued)

*Primary Examiner* — James M Anderson, II
(74) *Attorney, Agent, or Firm* — Holtz, Holtz & Volek PC

(57) ABSTRACT

An image processing apparatus includes a total pixel value calculator that sums pixel values by each color arranged in one direction and other direction, an occurrence start point detector that determines whether a pixel of interest is an axial chromatic aberration occurrence start point or not based on the calculation result or the pixel value of the pixel of interest and detects the start point, an area determining section that determines an area around the start point as an axial chromatic aberration area, a color space information calculator that calculates color space information, a color space difference calculator that calculates the difference of the color space information between the one direction and the other direction, a correction amount calculator that calculates the correction amount of axial chromatic aberration in accordance with the difference, and a corrector that corrects the axial chromatic aberration area.

20 Claims, 16 Drawing Sheets

(56) References Cited

U.S. PATENT DOCUMENTS

| | | |
|---|---|---|
| 2011/0199534 A1 | 8/2011 | Kawai |
| 2011/0234858 A1 | 9/2011 | Saito |
| 2012/0070083 A1 | 3/2012 | Ishiga et al. |
| 2012/0106841 A1 | 5/2012 | Tzur et al. |
| 2012/0212644 A1 | 8/2012 | Nashizawa |
| 2013/0021495 A1 | 1/2013 | Ichiyama et al. |
| 2014/0119650 A1 | 5/2014 | Zhou |
| 2017/0262964 A1 | 9/2017 | Fukutomi |

FOREIGN PATENT DOCUMENTS

| | | |
|---|---|---|
| JP | 4447649 B2 | 4/2010 |
| JP | 4487902 B2 | 6/2010 |
| JP | 4539278 B2 | 9/2010 |
| JP | 2011205477 A | 10/2011 |
| JP | 2012022286 A | 2/2012 |
| JP | 2012022287 A | 2/2012 |
| JP | 2012042988 A | 3/2012 |
| JP | 2012191607 A | 10/2012 |
| JP | 2013026755 A | 2/2013 |
| JP | 2013172402 A | 9/2013 |
| JP | 2014086932 A | 5/2014 |
| WO | 2007007878 A1 | 1/2007 |
| WO | 2007079039 A2 | 7/2007 |
| WO | 2013125198 A1 | 8/2013 |

OTHER PUBLICATIONS

International Search Report (ISR) (and English translation thereof) and Written Opinion dated Feb. 17, 2015 issued in International Application No. PCT/JP2014/081536.

FIG. 5

| (−m, −m) | | | (0, −m) | | | (m, −m) |
|---|---|---|---|---|---|---|
| | | | ⋮ | | | |
| | | (−1, −1) | (0, −1) | (1, −1) | | |
| (−m, 0) | ... | (−1, 0) | (0, 0) | (1, 0) | ... | (m, 0) |
| | | (−1, 1) | (0, 1) | (1, 1) | | |
| | | | ⋮ | | | |
| (−m, m) | | | (0, m) | | | (m, m) |

FIG. 6

| Pc(-m, -m) | | | Pc(0, -m) | | | Pc(m, -m) |
|---|---|---|---|---|---|---|
| | | | ⋮ | | | |
| | | Pc(-1, -1) | Pc(0, -1) | Pc(1, -1) | | |
| Pc(-m, 0) | ... | Pc(-1, 0) | Pc(0, 0) | Pc(1, 0) | ... | Pc(m, 0) |
| | | Pc(-1, 1) | Pc(0, 1) | Pc(1, 1) | | |
| | | | ⋮ | | | |
| Pc(-m, m) | | | Pc(0, m) | | | Pc(m, m) |

FIG. 7

| $P_{C}'$ $(-m, -m)$ | | | $P_{C}'$ $(0, -m)$ | | | $P_{C}'$ $(m, -m)$ |
|---|---|---|---|---|---|---|
| | | | ⋮ | | | |
| | | $P_{C}'$ $(-1, -1)$ | $P_{C}'$ $(0, -1)$ | $P_{C}'$ $(1, -1)$ | | |
| $P_{C}'$ $(-m, 0)$ | ... | $P_{C}'$ $(-1, 0)$ | $P_{C}'$ $(0, 0)$ | $P_{C}'$ $(1, 0)$ | ... | $P_{C}'$ $(m, 0)$ |
| | | $P_{C}'$ $(-1, 1)$ | $P_{C}'$ $(0, 1)$ | $P_{C}'$ $(1, 1)$ | | |
| | | | ⋮ | | | |
| $P_{C}'$ $(-m, m)$ | | | $P_{C}'$ $(0, m)$ | | | $P_{C}'$ $(m, m)$ |

FIG. 8

| Pc1 (-m, -m) | | | Pc1 (0, -m) | | | Pc2 (m, -m) |
|---|---|---|---|---|---|---|
| | | | ⋮ | | | |
| | | Pc1 (-1, -1) | Pc1 (0, -1) | Pc2 (1, -1) | | |
| Pc1 (-m, 0) | ... | Pc1 (-1, 0) | Pc1 (0, 0) | Pc2 (1, 0) | ... | Pc2 (m, 0) |
| | | Pc1 (-1, 1) | Pc1 (0, 1) | Pc2 (1, 1) | | |
| | | | ⋮ | | | |
| Pc1 (-m, m) | | | Pc1 (0, m) | | | Pc2 (m, m) |

FIG. 9

| Pc1'<br>(-m, -m) | | | Pc1'<br>(0, -m) | | | Pc2'<br>(m, -m) |
|---|---|---|---|---|---|---|
| | | | ⋮ | | | |
| | | Pc1'<br>(-1, -1) | Pc1'<br>(0, -1) | Pc2'<br>(1, -1) | | |
| Pc1'<br>(-m, 0) | ⋯ | Pc1'<br>(-1, 0) | Pc1'<br>(0, 0) | Pc2'<br>(1, 0) | ⋯ | Pc2'<br>(m, 0) |
| | | Pc1'<br>(-1, 1) | Pc1'<br>(0, 1) | Pc2'<br>(1, 1) | | |
| | | | ⋮ | | | |
| Pc1'<br>(-m, m) | | | Pc1'<br>(0, m) | | | Pc2'<br>(m, m) |

FIG. 17

| GB | B | GB | B | GB | B | GB |
|----|---|----|---|----|---|----|
| R | GR | R | GR | R | GR | R |
| GB | B | GB | B | GB | B | GB |
| R | GR | R | GR (0, 0) | R | GR | R |
| GB | B | GB | B | GB | B | GB |
| R | GR | R | GR | R | GR | R |
| GB | B | GB | B | GB | B | GB |

IMAGE PROCESSING APPARATUS, IMAGE PROCESSING METHOD, AND IMAGE PROCESSING PROGRAM PRODUCT

CROSS-REFERENCE TO RELATED APPLICATIONS

This is a continuation of International Application PCT/JP2015/063540, with an international filing date of May 12, 2015, which is hereby incorporated by reference herein in its entirety.

TECHNICAL FIELD

The present invention relates to an image processing apparatus, an image processing method, and an image processing program product.

BACKGROUND ART

It is known that axial chromatic aberration occurs in an image captured with a typical optical system. The axial chromatic aberration is a false color that results from an optical system, an imaging system, and an image processing system and occurs because a focal position on the optical axis varies depending on the wavelength, that is, coloring that does not occur on an original subject. A technology for image-processing-based correction of the axial chromatic aberration has been proposed (see PTL 1, for example).

In PTL 1, pixels of interest in image data are evaluated in terms of the following parameters representing false color possibility: the degree of closeness to overexposure, the magnitude of saturation; and the degree of closeness to a specific hue, and axial chromatic aberration is corrected by applying at least one of the parameters described above.

CITATION LIST

Patent Literature

{PTL 1}
Publication of Japanese Patent No. 4539278

SUMMARY OF INVENTION

The object of the present invention is to correct axial chromatic aberration with accuracy on the basis of human vision characteristics.

Solution to Problem

An image processing apparatus comprising a processor comprising hardware,
the processor being configured to implement:
An aspect of the present invention relates to an image processing apparatus including including a processor comprising hardware, the processor being configured to implement a total pixel value calculating process that sums pixel values of pixels, out of a plurality of pixels containing a pixel of interest in an input image and arranged in one line, arranged in one direction and another direction on opposite sides of the pixel of interest on a color basis, an occurrence start point detecting process that determines whether or not the pixel of interest is an axial chromatic aberration occurrence start point based on at least one of a result of the calculation performed by the total pixel value calculating process and the pixel value of the pixel of interest and detects the occurrence start point, an area determining process that determines a predetermined surrounding area around the pixel of interest detected as the occurrence start point to be an axial chromatic aberration area, a color space information calculating process that calculates color space information on the pixel of interest detected as the occurrence start point in a specific color space for the one direction and the other direction based on the result of the calculation performed by the total pixel value calculating process, a color space difference calculating process that calculates a difference between the color space information for the one direction and the color space information for the other direction calculated by the color space information calculating process, a correction amount calculating process that calculates a correction amount used to correct axial chromatic aberration in accordance with the difference calculated by the color space difference calculating process, and a correcting process that corrects the axial chromatic aberration area by using the correction amount.

In the aspect described above, the color space information calculating process may calculate at least one of information on color angle, information on color strength, and information on color lightness as the color space information in the specific color space, the color space difference calculating process may calculate at least one of a difference in the color angle, a difference in the color strength, and a difference in the color lightness as the difference between the color space information for the one direction and the color space information for the other direction based on the result of the calculation performed by the color space information calculating process, and the correction amount calculating process may calculate the amount of correction of the axial chromatic aberration based on a result of the calculation performed by the color space difference calculating process.

In the aspect described above, the occurrence start point detecting process may detect the pixel of interest as the axial chromatic aberration occurrence start point in a case where the pixel value of the pixel of interest is greater than a predetermined threshold, or in a case where a size relationship between a sum of G pixel values and a sum of R pixel values of the pixels arranged in the one direction that are calculated by the total pixel value calculating process is opposite to a size relationship between a sum of G pixel values and a sum of R pixel values of the pixels arranged in the other direction that are calculated by the total pixel value calculating process, or in a case where a size relationship between the sum of the G pixel values and a sum of B pixel values of the pixels arranged in the one direction is opposite to a size relationship between the sum of the G pixel values and a sum of B pixel values of the pixels arranged in the other direction.

In the aspect described above, the occurrence start point detecting process may determine that the pixel of interest is the axial chromatic aberration occurrence start point in a case where following conditional expressions are satisfied:

$$Pg_{D1} > Pr_{D1}$$

$$Pg_{D2} < Pr_{D2}$$

where $Pg_{D1}$ represents the sum of the G pixel values of the pixels arranged from the pixel of interest in the one direction, $Pg_{D2}$ represents the sum of the G pixel values of the pixels arranged from the pixel of interest in the other direction, $Pr_{D1}$ represents the sum of the R pixel values of the pixels arranged from the pixel of interest in the one direction, and $Pr_{D2}$ represents the sum of the R pixel values of the pixels arranged from the pixel of interest in the other direction.

In the aspect described above, the occurrence start point detecting process may determine that the pixel of interest is the axial chromatic aberration occurrence start point in a case where following conditional expressions are satisfied:

$$Pg_{D1} > Pb_{D1}$$

$$Pg_{D2} < Pb_{D2}$$

where $Pg_{D1}$ represents the sum of the G pixel values of the pixels arranged from the pixel of interest in the one direction, $Pg_{D2}$ represents the sum of the G pixel values of the pixels arranged from the pixel of interest in the other direction, $Pb_{D1}$ represents the sum of the B pixel values of the pixels arranged from the pixel of interest in the one direction, and $Pb_{D2}$ represents the sum of the B pixel values of the pixels arranged from the pixel of interest in the other direction.

In the aspect described above, the occurrence start point detecting process may determine that the pixel of interest is the axial chromatic aberration occurrence start point in a case where following conditional expressions are satisfied:

$$Pg_{D1} > Pr_{D1}$$

$$Pg_{D2} < Pr_{D2}$$

$$Pg_{D2} < Pb_{D2}$$

where $Pg_{D1}$ represents the sum of the G pixel values of the pixels arranged from the pixel of interest in the one direction, $Pg_{D2}$ represents the sum of the G pixel values of the pixels arranged from the pixel of interest in the other direction, $Pr_{D1}$ represents the sum of the R pixel values of the pixels arranged from the pixel of interest in the one direction, $Pr_{D2}$ represents the sum of the R pixel values of the pixels arranged from the pixel of interest in the other direction, and $Pb_{D2}$ represents the sum of the B pixel values of the pixels arranged from the pixel of interest in the other direction.

In the aspect described above, the occurrence start point detecting process may determine that the pixel of interest is the axial chromatic aberration occurrence start point in a case where following conditional expressions are satisfied:

$$Pg_{D1} > Pb_{D1}$$

$$Pg_{D2} < Pr_{D2}$$

$$Pg_{D2} < Pb_{D2}$$

where $Pg_{D1}$ represents the sum of the G pixel values of the pixels arranged from the pixel of interest in the one direction, $Pg_{D2}$ represents the sum of the G pixel values of the pixels arranged from the pixel of interest in the other direction, $Pr_{D2}$ represents the sum of the R pixel values of the pixels arranged from the pixel of interest in the other direction, $Pb_{D1}$ represents the sum of the B pixel values of the pixels arranged from the pixel of interest in the one direction, and $Pb_{D2}$ represents the sum of the B pixel values of the pixels arranged from the pixel of interest in the other direction.

In the aspect described above, the occurrence start point detecting process may determine that the pixel of interest is the axial chromatic aberration occurrence start point in a case where following conditional expressions are satisfied:

$$Pg_{D1} > Pr_{D1}$$

$$Pg_{D1} > Pb_{D1}$$

$$Pg_{D2} < Pr_{D2}$$

where $Pg_{D1}$ represents the sum of the G pixel values of the pixels arranged from the pixel of interest in the one direction, $Pg_{D2}$ represents the sum of the G pixel values of the pixels arranged from the pixel of interest in the other direction, $Pr_{D1}$ represents the sum of the R pixel values of the pixels arranged from the pixel of interest in the one direction, $Pr_{D2}$ represents the sum of the R pixel values of the pixels arranged from the pixel of interest in the other direction, and $Pb_{D1}$ represents the sum of the B pixel values of the pixels arranged from the pixel of interest in the one direction.

In the aspect described above, the occurrence start point detecting process may determine that the pixel of interest is the axial chromatic aberration occurrence start point in a case where following conditional expressions are satisfied:

$$Pg_{D1} > Pr_{D1}$$

$$Pg_{D1} > Pb_{D1}$$

$$Pg_{D2} < Pb_{D2}$$

where $Pg_{D1}$ represents the sum of the G pixel values of the pixels arranged from the pixel of interest in the one direction, $Pg_{D2}$ represents the sum of the G pixel values of the pixels arranged from the pixel of interest in the other direction, $Pr_{D1}$ represents the sum of the R pixel values of the pixels arranged from the pixel of interest in the one direction, $Pb_{D1}$ represents the sum of the B pixel values of the pixels arranged from the pixel of interest in the one direction, and $Pb_{D2}$ represents the sum of the B pixel values of the pixels arranged from the pixel of interest in the other direction.

In the aspect described above, the occurrence start point detecting process may determine that the pixel of interest is the axial chromatic aberration occurrence start point in a case where following conditional expressions are satisfied:

$$Pg_{D1} + TH_{R1} > Pr_{D1}$$

$$Pg_{D2} - TH_{R2} < Pr_{D2}$$

$$Pg_{D1} + TH_{B1} > Pb_{D1}$$

$$Pg_{D2} - TH_{B2} < Pr_{D2}$$

where $Pg_{D1}$ represents the sum of the G pixel values of the pixels arranged from the pixel of interest in the one direction, $Pg_{D2}$ represents the sum of the G pixel values of the pixels arranged from the pixel of interest in the other direction, $Pr_{D1}$ represents the sum of the R pixel values of the pixels arranged from the pixel of interest in the one direction, $Pr_{D2}$ represents the sum of the R pixel values of the pixels arranged from the pixel of interest in the other direction, $Pb_{D1}$ represents the sum of the B pixel values of the pixels arranged from the pixel of interest in the one direction, $Pb_{D2}$ represents the sum of the B pixel values of the pixels arranged from the pixel of interest in the other direction, and $TH_{R1}$, $TH_{R2}$, $TH_{B1}$, and $TH_{B2}$ are each an arbitrary constant.

In the aspect described above, the occurrence start point detecting process may determine that the pixel of interest is the axial chromatic aberration occurrence start point in a case where following conditional expressions are satisfied:

$$Pg_{D1} + TH_R > Pr_{D1}$$

$$Pg_{D2} + TH_R < Pr_{D2}$$

$$Pg_{D1} + TH_B > Pb_{D1}$$

$$Pg_{D2} + TH_B < Pb_{D2}$$

where $Pg_{D1}$ represents the sum of the G pixel values of the pixels arranged from the pixel of interest in the one direction, $Pg_{D2}$ represents the sum of the G pixel values of the pixels arranged from the pixel of interest in the other direction, $Pr_{D1}$ represents the sum of the R pixel values of the pixels arranged from the pixel of interest in the one direction, $Pr_{D2}$ represents the sum of the R pixel values of the pixels arranged from the pixel of interest in the other direction, $Pb_{D1}$ represents the sum of the B pixel values of the pixels arranged from the pixel of interest in the one direction, $Pb_{D2}$ represents the sum of the B pixel values of the pixels arranged from the pixel of interest in the other direction, and $TH_R$ and $TH_B$ are each an arbitrary constant.

In the aspect described above, the occurrence start point detecting process may determine that the pixel of interest is the axial chromatic aberration occurrence start point in a case where following conditional expressions are satisfied:

$$Pg_{D1} > Pr_{D1} \times K_R$$

$$Pg_{D2} < Pr_{D2} \times K_R$$

$$Pg_{D1} > Pb_{D1} \times K_B$$

$$Pg_{D2} < Pb_{D2} \times K_B$$

where $Pg_{D1}$ represents the sum of the G pixel values of the pixels arranged from the pixel of interest in the one direction, $Pg_{D2}$ represents the sum of the G pixel values of the pixels arranged from the pixel of interest in the other direction, $Pr_{D1}$ represents the sum of the R pixel values of the pixels arranged from the pixel of interest in the one direction, $Pr_{D2}$ represents the sum of the R pixel values of the pixels arranged from the pixel of interest in the other direction, $Pb_{D1}$ represents the sum of the B pixel values of the pixels arranged from the pixel of interest in the one direction, $Pb_{D2}$ represents the sum of the B pixel values of the pixels arranged from the pixel of interest in the other direction, and $K_R$ and $K_B$ are each an arbitrary constant.

In the aspect described above, the image may have all RGB pixel values at each pixel.

The configuration described above allows processing to detect an axial chromatic aberration occurrence start point even in a synchronized image in which all RGB pixel values are simultaneously acquired at each pixel.

In the aspect described above, the image may have pixel values missing at least one pixel value out of RGB at each pixel.

Another aspect of the present invention relates to an image processing method including a total pixel value calculating step of summing pixel values of pixels, out of a plurality of pixels containing a pixel of interest in an input image and arranged in one line, arranged in one direction and another direction on opposite sides of the pixel of interest on a color basis, an occurrence start point detecting step of detecting the pixel of interest as an axial chromatic aberration occurrence start point based on at least one of a result of the calculation performed in the total pixel value calculating step and the pixel value of the pixel of interest, an area determining step of determining a predetermined surrounding area around the pixel of interest detected as the occurrence start point to be an axial chromatic aberration area, a color space information calculating step of calculating color space information on the pixel of interest detected as the occurrence start point in a specific color space for the one direction and the other direction based on the result of the calculation performed in the total pixel value calculating step, a color space difference calculating step of calculating a difference between the color space information for the one direction and the color space information for the other direction calculated in the color space information calculating step, a correction amount calculating step of calculating a amount of correction of axial chromatic aberration in accordance with the difference calculated in the color space difference calculating step, and a correcting step of correcting the axial chromatic aberration area by using the correction amount.

In the other aspect described above, in the color space information calculating step, at least one of information on color angle, information on color strength, and information on color lightness may be calculated as the color space information in the specific color space, in the color space difference calculating step, at least one of a difference in the color angle, a difference in the color strength, and a difference in the color lightness may be calculated as the difference between the color space information for the one direction and the color space information for the other direction based on the result of the calculation performed in the color space information calculating step, and in the correction amount calculating step, the amount of correction of the axial chromatic aberration may be calculated based on a result of the calculation performed in the color space difference calculating step.

In the other aspect described above, in the occurrence start point detecting step, the pixel of interest may be detected as the axial chromatic aberration occurrence start point in a case where the pixel value of the pixel of interest is greater than a predetermined threshold, or in a case where a size relationship between a sum of G pixel values and a sum of R pixel values of the pixels arranged in the one direction that are calculated by the total pixel value calculating step is opposite to a size relationship between a sum of G pixel values and a sum of R pixel values of the pixels arranged in the other direction that are calculated by the total pixel value calculating step, or in a case where a size relationship between the sum of the G pixel values and a sum of B pixel values of the pixels arranged in the one direction is opposite to a size relationship between the sum of the G pixel values and a sum of B pixel values of the pixels arranged in the other direction.

Another aspect of the present invention relates to an image processing program product including a non-transitory computer readable program medium, and an image processing program stored in the non-transitory computer readable medium, wherein the image processing program that causes a computer to carry out a total pixel value calculating step of summing pixel values of pixels, out of a plurality of pixels containing a pixel of interest in an input image and arranged in one line, arranged in one direction and another direction on opposite sides of the pixel of interest on a color basis, an occurrence start point detecting step of detecting the pixel of interest as an axial chromatic aberration occurrence start point based on at least one of a result of the calculation performed in the total pixel value calculating step and the pixel value of the pixel of interest, an area determining step of determining a predetermined surrounding area around the pixel of interest detected as the occurrence start point to be an axial chromatic aberration area, a color space information calculating step of calculating color space information on the pixel of interest detected as the occurrence start point in a specific color space for the one direction and the other direction based on the result of the calculation performed in the total pixel value calculating step, a color space difference calculating step of calculating a difference between the color space information for the one direction and the color space information for the other direction calculated in the color space information calculating step, a correction amount calculating step of calculating a amount of correction of axial chromatic aberration in accordance with the difference calculated in the color space difference calculating step, and a correcting step of correcting the axial chromatic aberration area by using the correction amount.

In the other aspect described above, in the color space information calculating step, the computer may calculate at least one of information on color angle, information on color strength, and information on color lightness as the color space information in the specific color space, in the color space difference calculating step, the computer may calculate at least one of a difference in the color angle, a difference in the color strength, and a difference in the color lightness as the difference between the color space information for the one direction and the color space information for the other direction based on the result of the calculation performed in the color space information calculating step, and in the correction amount calculating step, the computer may calculate the amount of correction of the axial chromatic aberration based on a result of the calculation performed in the color space difference calculating step.

In the other aspect described above, in the occurrence start point detecting step, the computer may detect the pixel of interest as the axial chromatic aberration occurrence start point in a case where the pixel value of the pixel of interest is greater than a predetermined threshold, or in a case where a size relationship between a sum of G pixel values and a sum of R pixel values of the pixels arranged in the one direction that are calculated by the total pixel value calculating step is opposite to a size relationship between a sum of G pixel values and a sum of R pixel values of the pixels arranged in the other direction that are calculated by the total pixel value calculating step, or in a case where a size relationship between the sum of the G pixel values and a sum of B pixel values of the pixels arranged in the one direction is opposite to a size relationship between the sum of the G pixel values and a sum of B pixel values of the pixels arranged in the other direction.

BRIEF DESCRIPTION OF DRAWINGS

FIG. 5 shows the relationship between the coordinates of a pixel of interest set in the image processing apparatus in FIG. 1 and the coordinates of surrounding pixels around the pixel of interest.

FIG. 6 shows the relationship between the coordinates of the pixel of interest set in the image processing apparatus in FIG. 1 and the coordinates of the surrounding pixels around the pixel of interest and particularly shows the relationship between the coordinates of the pixel of interest and the coordinates of the surrounding pixels around the pixel of interest before correction.

FIG. 7 shows the relationship between the coordinates of the pixel of interest set in the image processing apparatus in FIG. 1 and the coordinates of the surrounding pixels around the pixel of interest and particularly shows the relationship between the coordinates of the pixel of interest and the coordinates of the surrounding pixels around the pixel of interest after correction.

FIG. 8 shows the relationship between the coordinates of the pixel of interest set in the image processing apparatus in FIG. 1 and the coordinates of the surrounding pixels around the pixel of interest and particularly shows the relationship between the coordinates of the pixel of interest and the coordinates of the surrounding pixels around the pixel of interest before correction in a case where the position of the pixel of interest is so determined as to be located in a direction D1.

FIG. 9 shows the relationship between the coordinates of the pixel of interest set in the image processing apparatus in FIG. 1 and the coordinates of the surrounding pixels around the pixel of interest and particularly shows the relationship between the coordinates of the pixel of interest and the coordinates of the surrounding pixels around the pixel of interest after correction in the case where the position of the pixel of interest is so determined as to be located in the direction D1.

FIG. 17 shows a pixel arrangement in a case where a GR component in an image acquired with a Bayer-arrangement imaging device forms the pixel of interest.

DESCRIPTION OF EMBODIMENTS

An image processing apparatus and an image processing method according to an embodiment of the present invention will be described below with reference to the drawings.

The image processing apparatus according to the present embodiment performs image processing that will be described later on an input image captured with a camera. The input image, which is a target to be processed by an image processing apparatus 1, is an image signal representing light that is incident via an imaging optical system that is not shown, is converted into an electric signal by a solid-state imaging device, undergoes fixed noise pattern removal, analog gain adjustment, and other types of signal processing, is converted into a digital signal by an A/D converter, and undergoes a variety of types of image processing. The input image is a full-color image formed of pixels each providing complete RGB signal values, specifically, a three-panel color image acquired with a three-panel imaging device or a single-panel color image acquired with a single-panel imaging device and having undergone interpolation so that each of the pixels provides RGB values.

Figure 1:
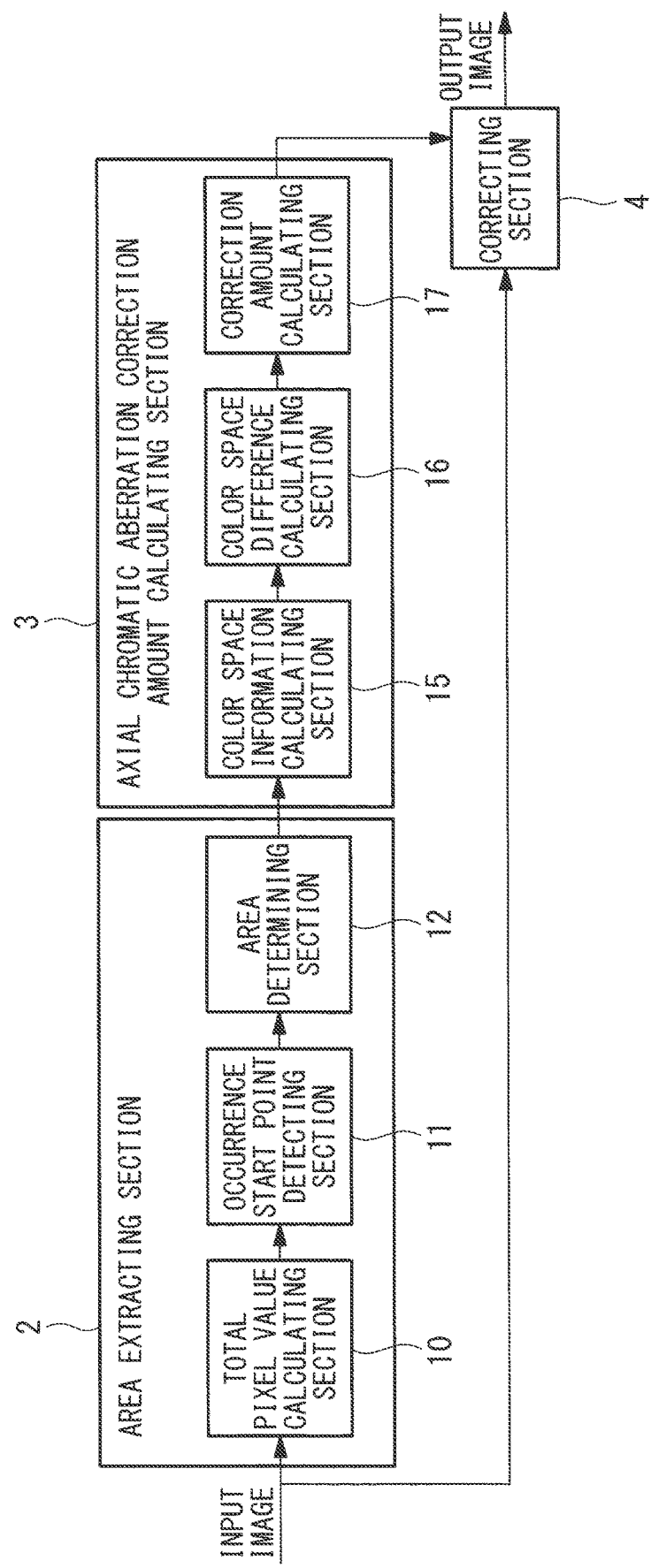
FIG. 1 is a block diagram showing an image processing apparatus according to an embodiment of the present invention.

The image processing apparatus according to the present embodiment includes an area extracting section 2, which extracts an axial chromatic aberration area where axial chromatic aberration occurs in an input image, an axial chromatic aberration correction amount calculating section 3, which calculates the amount of correction made on the axial chromatic aberration area extracted by the area extracting section 2, and an aberration correcting section 4, which outputs an output image in which the axial chromatic aberration in the axial chromatic aberration area has been corrected, as shown in FIG. 1.

The area extracting section 2 includes a total pixel value calculating section 10, an occurrence start point detecting section 11, and an area determining section 12.

The total pixel value calculating section 10 sets a pixel of interest in the input image, focuses attention on a plurality of pixels arranged in a line containing the set pixel of interest, and sums the pixel values of the pixels arranged in one direction (D1) and the other direction (D2) on opposite sides of the pixel of interest on a color basis.

The occurrence start point detecting section 11 determines whether the pixel of interest is the start point where the axial chromatic aberration occurs on the basis of at least one of the pixel value of the pixel of interest, the sum of the pixel values of the pixels arranged in the one direction on one side of the pixel of interest and calculated by the total pixel value calculating section 10, and the sum of the pixel values of the pixels arranged in the other direction on the other side of the pixel of interest and calculated by the total pixel value calculating section 11 and detects the pixel of interest that is the occurrence start point.

Figure 2:
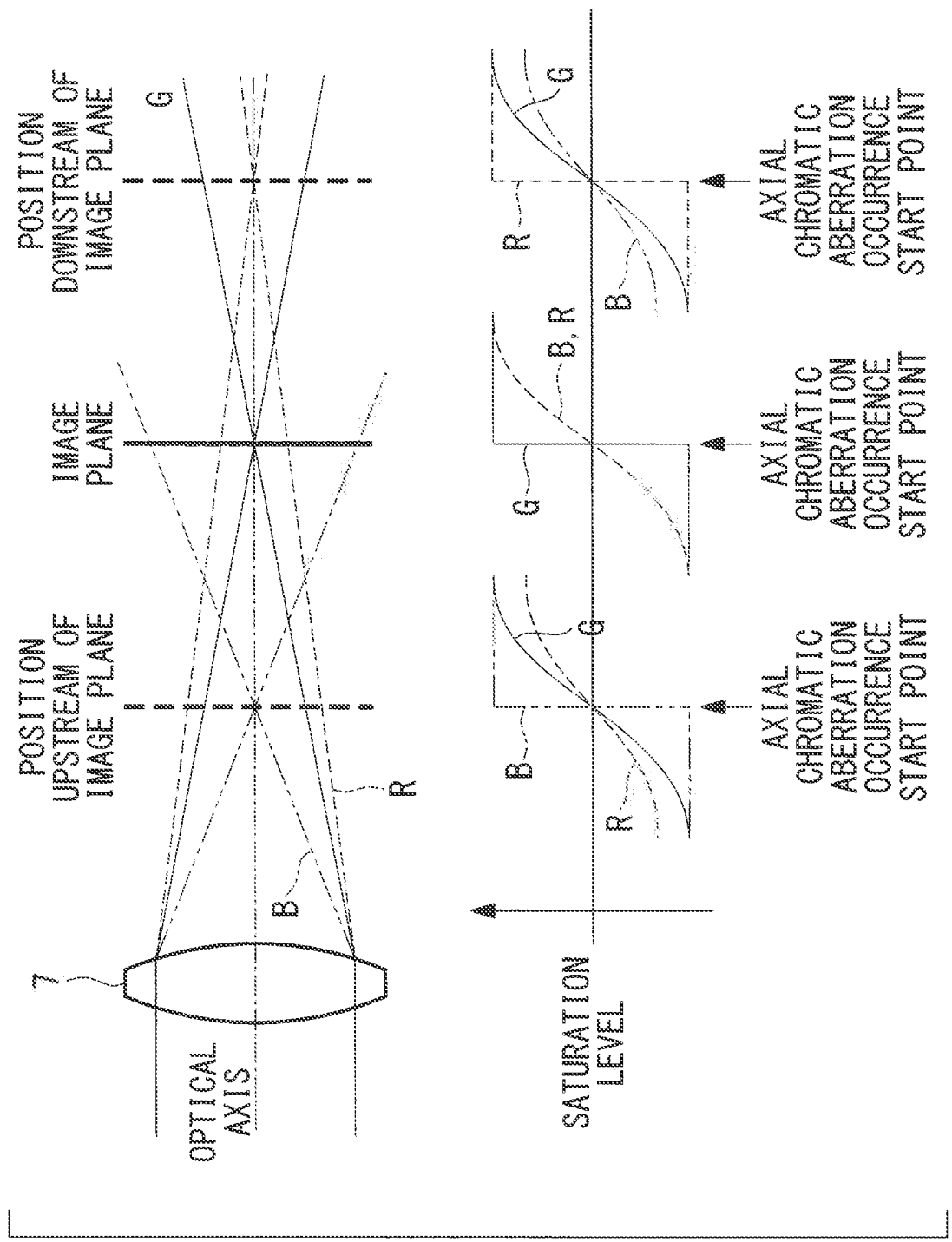
FIG. 2 schematically shows the relationship between an optical system used with the image processing apparatus in FIG. 1 and axial chromatic aberration.
Figure 3:
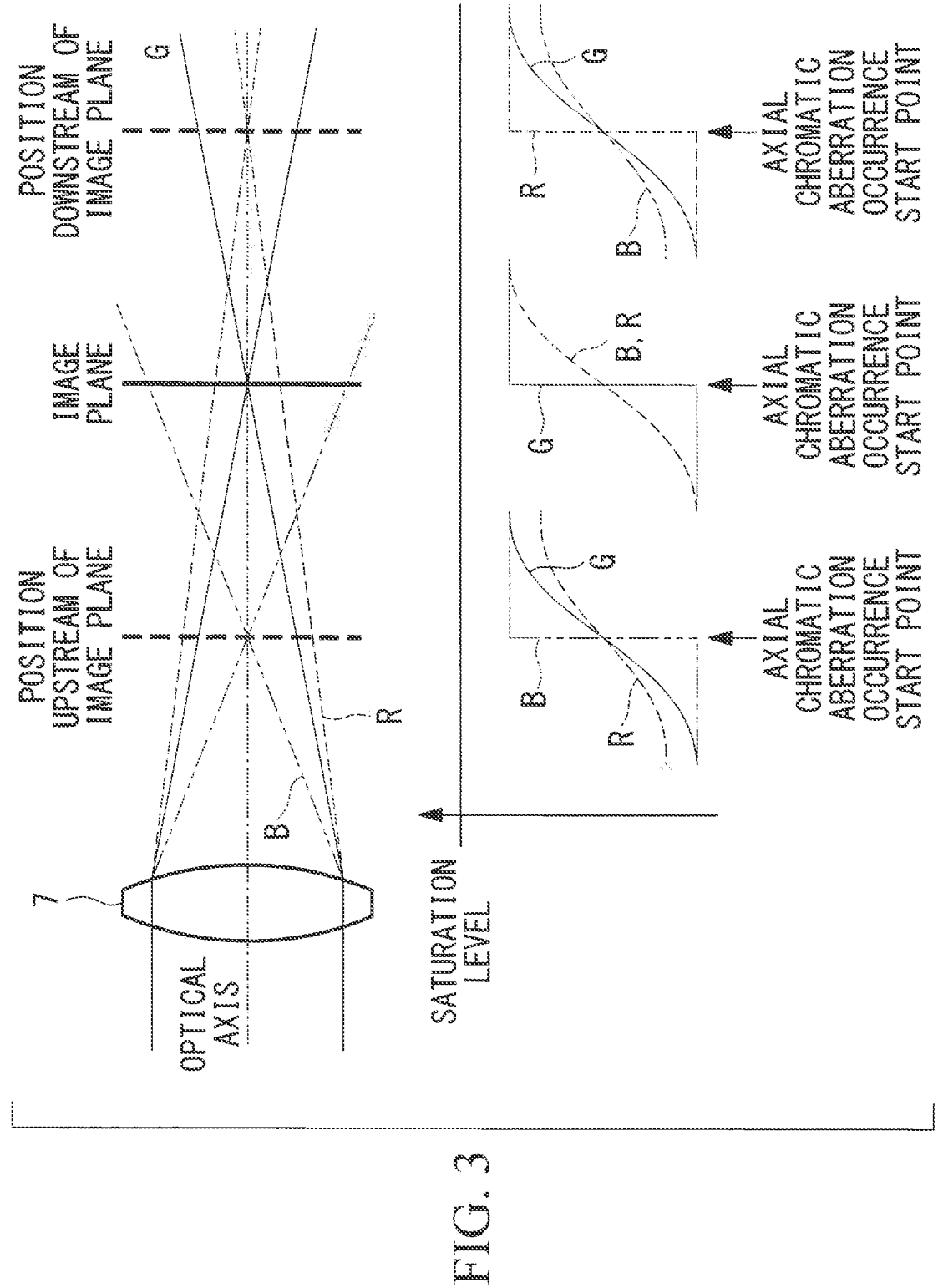
FIG. 3 schematically shows the relationship between an optical system used with the image processing apparatus in FIG. 1 and axial chromatic aberration.

The axial chromatic aberration occurrence start point detected by the occurrence start point detecting section 11 means, for example, at least one of a pixel of interest where the magnitude of the G pixel value of the pixel of interest reaches a saturation level as shown in FIG. 2 and a pixel of interest in a case where pixels are arranged along a straight line with the pixel of interest contained therein and the color of the pixels arranged in one direction and the color of the pixels arranged in the other direction on opposite sides of the pixel of interest differ from each other as shown in FIG. 3.

That is, in a typical optical system 7, it is known that light rays having wavelengths different from one another are focused in positions different from one another along the optical axis in the depth direction, as shown in FIGS. 2 and 3. In general, an R light ray having a wavelength longer than that of a G light ray is focused in a position in the optical axis direction downstream of the position where the G light ray is focused, and a B light ray having a wavelength shorter than that of the G light ray is focused in a position in the optical axis direction upstream of the position where the G light ray is focused. The discrepancies among the positions where the RGB light rays are focused form visible axial chromatic aberration.

In a case where an image of an achromatic-color step edge is captured, the G light forms the shape of the step edge in the image plane, but the R or B light is not focused in the image plane so that the images of the step edges formed by the R and B light each have a blurred shape. On the other hand, in a position downstream of the image plane, the G light is not focused so that the image of the step edge formed by the G light has a blurred shape, but the R light is focused so that the shape of the image of the step edge is maintained. The image of the step edge formed by the B light has a more blurred shape than the shape of the image of the step edge formed by the G light.

Conversely, in a position upstream of the image plane, since the G light is not focused, the image of the step edge has a blurred shape, but the B light is focused so that the shape of the image of the step edge is maintained. The image of the step edge formed by the R light has a more blurred shape than the shape of the image of the step edge formed by the G light.

The area determining section 12 determines a predetermined surrounding area around the pixel of interest, which is the occurrence start point detected by the occurrence start point detecting section 11, to be an axial chromatic aberration area. That is, in the case where the pixel of interest is detected as the axial chromatic aberration occurrence start point, the pixel of interest is the axial chromatic aberration correction target, and the area formed of the pixel of interest and predetermined surrounding pixels around the pixel of interest is therefore determined to be the axial chromatic aberration area. For example, a 5×5 pixel area, a 7×7 pixel area, or any other area around the pixel of interest can be appropriately set as the axial chromatic aberration area.

The axial chromatic aberration correction amount calculating section 3 includes a color space information calculating section 15, a color space difference calculating section 16, and a correction amount calculating section 17.

The color space information calculating section 15 calculates color space information in a specific color space on the pixel of interest detected as the occurrence start point by the occurrence start point detecting section 11 in each of the one direction and the other direction from the pixel of interest. The specific color space can, for example, be an HSV space or an L*a*b space. The color space information is calculated on the basis of the sum of the pixel values of the pixels arranged in the one direction (D1) and the other direction (D2) on opposite sides of the pixel of interest on a color basis and calculated by the total pixel value calculating section 10.

The color space difference calculating section 16 calculates the difference between the color space information in the one direction and the color space information in the other direction calculated by the color space information calculating section 15.

The correction amount calculating section 17 calculates the amount of correction made on the axial chromatic aberration area in accordance with the difference calculated by the color space difference calculating section 16.

The aberration correcting section 4 uses the correction amount calculated by the correction amount calculating section 17 to correct the axial chromatic aberration area.

Figure 4:
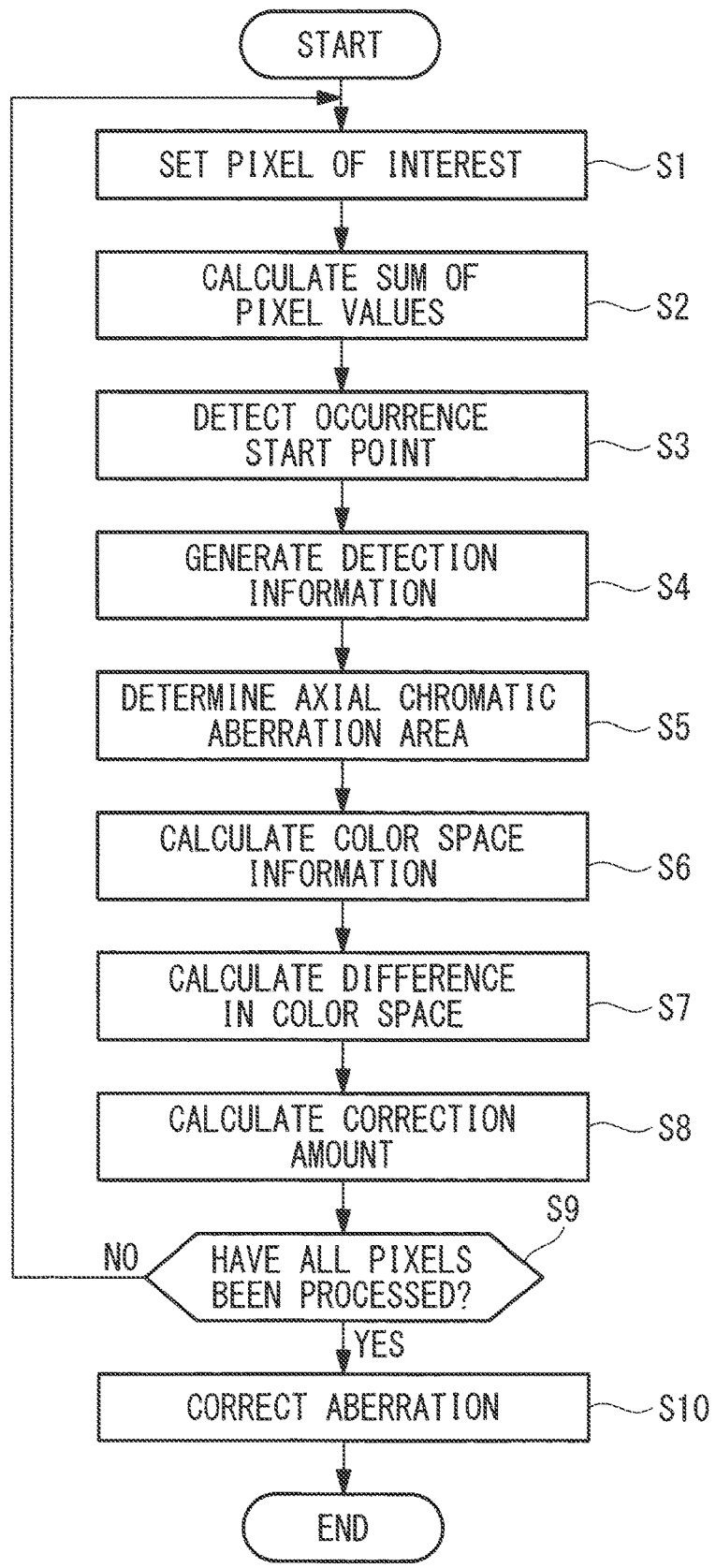
FIG. 4 is a flowchart for describing an image processing method using the image processing apparatus in FIG. 1.

An image processing method as an effect of the thus configured image processing apparatus according to the present embodiment will be described below with reference to the flowchart of FIG. 4.

Figure 5:
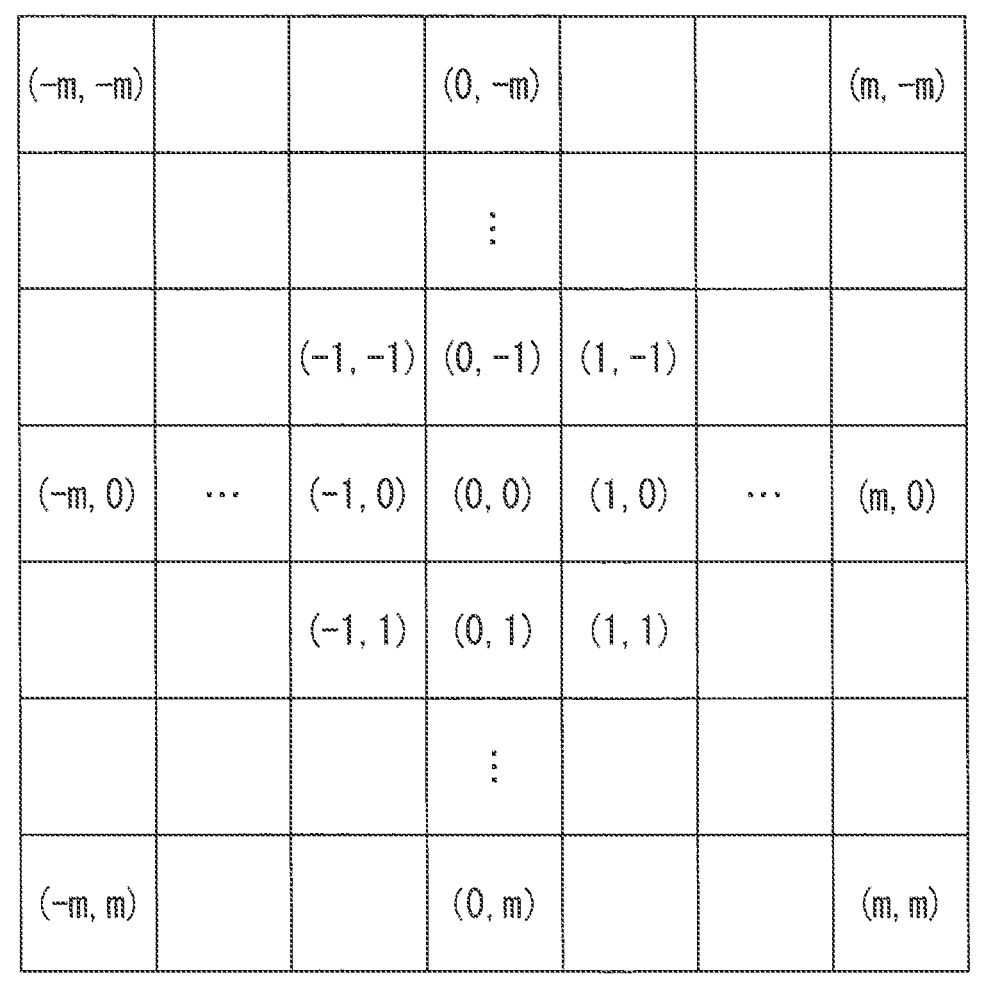

In step S1, as shown in FIG. 5, the total pixel value calculating section 10 sets a pixel of interest (0, 0) in an input image, and in the following step S2 (total pixel value calculating step), the total pixel value calculating section 10 calculates the sum of the pixel values of a plurality of pixels arranged on each side of the pixel of interest in each of the following four directions in FIG. 5: the vertical direction; the horizontal direction; the right obliquely upward (downward) direction; and the left obliquely upward (downward) direction with respect to the pixel of interest (step S2).

Specifically, the sum of the pixel values on a color basis in each of the directions is calculated in accordance with the expression indicated by Equation 1.

$$P_{cL} = \sum_{i=1}^{m} Pc(-i, 0)$$

$$P_{cR} = \sum_{i=1}^{m} Pc(i, 0)$$

$$P_{cT} = \sum_{i=1}^{m} Pc(0, -i)$$

$$P_{cB} = \sum_{i=1}^{m} Pc(0, i)$$

$$P_{cLT} = \sum_{i=1}^{m} Pc(-i, -i)$$

$$P_{cLB} = \sum_{i=1}^{m} Pc(-i, i)$$

$$P_{cRT} = \sum_{i=1}^{m} Pc(i, -i)$$

$$P_{cRB} = \sum_{i=1}^{m} Pc(i, i)$$

{Equation 1}

In Equation 1, $P_c(x, y)$ represents the pixel value of the pixel located in the coordinates (x, y), $P_{cB}$ represents the sum of the pixel values of the pixels in the pixel row on the left of the pixel of interest, $P_{cR}$ represents the sum of the pixel values of the pixels in the pixel row on the right of the pixel of interest, $P_{cT}$ represents the sum of the pixel values of the pixels in the pixel row above the pixel of interest, $P_{cB}$ represents the sum of the pixel values of the pixels in the pixel row below the pixel of interest, $P_{cLT}$ represents the sum of the pixel values of the pixels in the pixel row on the upper left of the pixel of interest, $P_{cLB}$ represents the sum of the pixel values of the pixels in the pixel row on the lower left of the pixel of interest, $P_{cRT}$ represents the sum of the pixel values of the pixels in the pixel row on the upper right of the pixel of interest, and $P_{cRB}$ represents the sum of the pixel values of the pixels in the pixel row on the lower right of the pixel of interest. The subscript c means the color and can be replaced with r, g, or b, and $P_c$ with c replaced with r, g, or b represents a calculated sum of the pixel values of the color. Reference characters i and m each represent a positive integer.

In step S3 (occurrence start point detecting step), the occurrence start point detecting section 11 detects the pixel of interest as the axial chromatic aberration occurrence start point in a case where the following Conditional Expression (1) is satisfied or the sums of the pixel values calculated by the total pixel value calculating section 10 satisfy all Conditional Expressions (2) to (5).

Conditional Expression (1) indicates that the pixel of interest is detected as the axial chromatic aberration occurrence start point in a case where the magnitude of the G pixel value of the pixel of interest is greater than an arbitrary saturation level threshold THsat.

$$Pg(0,0) > THsat \tag{1}$$

$$Pg_{D1} > Pr_{D1} \tag{2}$$

$$Pg_{D2} < Pr_{D2} \tag{3}$$

$$Pg_{D1} > Pb_{D1} \tag{4}$$

$$Pg_{D2} < Pb_{D2} \tag{5}$$

In the above expressions, $Pg_{D1}$ represents the sum of the G pixel values of the pixels arranged from the pixel of interest in the one direction D1, $Pg_{D2}$ represents the sum of the G pixel values of the pixels arranged from the pixel of interest in the other direction D2, $Pr_{D1}$ represents the sum of the R pixel values of the pixels arranged from the pixel of interest in the one direction D1, $Pr_{D2}$ represents the sum of the R pixel values of the pixels arranged from the pixel of interest in the other direction D2, $Pb_{D1}$ represents the sum of the B pixel values of the pixels arranged from the pixel of interest in the one direction D1, and $Pb_{D2}$ represents the sum of the B pixel values of the pixels arranged from the pixel of interest in the other direction D2.

The subscript D1 represents the one direction from the pixel of interest and corresponds, for example, to L, T, LT, and LB in Equation 1. Similarly, the subscript D2 represents the other direction from the pixel of interest and corresponds, for example, to R, B, RT, and RB in Equation 1. The directions can be arbitrarily defined, but in the case where L, T, LT, and LB are selected as D1, D2 corresponds to R, B, RT, and RB.

It is assumed in Conditional Expression (1) that only the G component of the pixel of interest is used in the comparison of the pixel of interest with the arbitrary saturation level threshold THsat, but this is not necessarily the case. For example, a saturation level threshold can be compared with the luminance value of the pixel of interest, or any other known method can be used. Further, the method for calculating the axial chromatic aberration occurrence start point in an area other than a nearly saturated area is not limited to the example described above, and any other known method can be used.

In step S4 (detection information generating step), the occurrence start point detecting section 11 generates detection information representing that a pixel of interest detected as the axial chromatic aberration occurrence start point is set at "0" and pixels detected as no occurrence start point are set at "1". In the case where the pixel of interest is detected as the axial chromatic aberration occurrence start point, the occurrence start point detecting section 11 holds $Pr_{D1}$, $Pr_{D2}$, $Pg_{D1}$, $Pg_{D2}$, $Pb_{D1}$, and $Pb_{D2}$ in correspondence with the position of the pixel of interest.

Further, in the case where the pixel of interest is detected as the axial chromatic aberration occurrence start point, the occurrence start point detecting section 11 holds the direction out of the four directions in FIG. 5, the vertical direction, the horizontal direction, the right obliquely upward (downward) direction, and the left obliquely upward (downward) direction, that satisfies the Conditional Expressions (2) to (5) described above in correspondence with the position of the pixel of interest and holds the one direction D1 and the other direction D2 along the determined direction.

That is, the occurrence start point detecting section 11 holds the direction out of L, T, LT, and LB that corresponds to D1 and the direction out of R, B, RT, and RB that corresponds to D2 as information relating to the detection information.

In step S5 (area determining step), in the case where the pixel of interest is detected as the axial chromatic aberration occurrence start point, that is, in the case where the detection information generated by the occurrence start point detecting section 11 on the pixel of interest is "0", the area determining section 12 determines that an area containing the pixel of interest and a predetermined surrounding pixels is the axial chromatic aberration area. For example, an area containing 7×7 pixels around the pixel where the detection information is "0" can be set as the axial chromatic aberration area as appropriate.

In step S6 (color space information calculating step), the color space information calculating section 15 calculates color space information in a specific color space from $Pr_{D1}$, $Pg_{D1}$, and $Pb_{D1}$ and $Pr_{D2}$, $Pg_{D2}$, and $Pb_{D2}$ corresponding to the position of the pixel having detection information set at "0".

For example, assuming that the specific color space is an HSV space, the color space information calculating section 15 calculates at least one of $Ph_{D1}$, $Ps_{D1}$, and $Pv_{D1}$ from $Pr_{D1}$, $Pg_{D1}$, and $Pb_{D1}$ and calculates one of $Ph_{D2}$, $Ps_{D2}$, and $Pv_{D2}$ that is color space information in the same direction D1 from $Pr_{D2}$, $Pg_{D2}$, ad $Pb_{D2}$.

$Ph_{D1}$ and $Ph_{D2}$ represent color space information on the angles (hues) for the directions D1 and D2 at the pixel of interest detected as the occurrence start point, $Ps_{D1}$ and $Ps_{D2}$ represent color space information on the strength (chroma) for the directions D1 and D2 at the pixel of interest detected as the occurrence start point, and $Pv_{D1}$ and $Pv_{D2}$ represent color space information on the lightness (brightness) for the directions D1 and D2 at the pixel of interest detected as the occurrence start point.

Assuming that the specific color space is an L*a*b* space, the color space information calculating section 15 calculates at least one of Pl*D1, Pa*D1, and Pb*D1 from $Pr_{D1}$, $Pg_{D1}$, and $Pb_{D1}$ and calculates one of Pl*D2, Pa*D2, and Pb*D2 that is color space information in the same direction D1 from $Pr_{D2}$, $Pg_{D2}$, ad $Pb_{D2}$. Pl*D1 and Pl*D2 represent color space information on the lightness (brightness) for the directions D1 and D2 at the pixel of interest determined as the occurrence start point, Pa*D1, Pb*D1, Pa*D2, and Pb*D2 are information on complementary colors and can be used as color space information on the angle and strength.

In step S7 (color space difference calculating step), the color space difference calculating section 16 calculates the difference in color space from color space information in two directions. The color space difference calculating section 16 calculates, as the difference, at least one of the difference in color angle, the difference in color strength, and the difference in lightness.

In step S8 (correction amount calculating step), the color space difference calculating section 16 calculates the correction amount on the basis of the difference calculated by the color space difference calculating section 16, and in the following step S9, it is determined whether all pixels have been processed. In a case where all pixels have not been processed, the control returns to step S1, and steps S2 to S7 are repeated with a pixel that has not been processed set as the pixel of interest.

In a case where all pixels have been processed, in step S10 (aberration correcting step), the aberration correcting section 4 uses the correction amount calculated by the correction amount calculating section 17 to correct the axial chromatic aberration area set by the area determining section 12, and the entire procedure is terminated.

As described above, the axial chromatic aberration area can be corrected by calculating at least one of the angle, strength, and lightness of a color as the color space information, calculating at least one of the difference in the angle, the difference in the strength, and the difference in the lightness from the calculated color space information, and calculating the correction amount on the basis of information on any one of the differences or the combination of a plurality of the differences.

A specific example will be described in the case where any of the difference in the angle, the difference in the strength, and the difference in the lightness or the combination of a plurality thereof is used to calculate the correction amount.

(Case where Correction is Made Based on Color Space Information on Angle)

The color space information calculating section 15 calculates color space information on the angle for each of two directions (D1, D2) held as information on the detection information by the occurrence start point detecting section 11 (step S6).

The color space difference calculating section 16 uses the calculated color space information on the angle to calculate the difference in the color space information (step S7).

Specifically, in the case where the specific color space is an HSV space, $Ph_{D1}$ and $Ph_{D2}$ are calculated as the color space information on the angle, and an absolute value Pangle of the difference between $Ph_{D1}$ and $Ph_{D2}$ is calculated in accordance with the following Expression (6):

$$Pangle = |Ph_{D1} - Ph_{D2}| \quad (6)$$

In the case where the specific color space is an L*a*b* space, Pa*D1, Pb*D1, Pa*D2, and Pb*D2 are calculated as the color space information on the angle, and an absolute value Pangle of the difference associated with Pa*D1, Pb*D1, Pa*D2, and Pb*D2 is calculated in accordance with the following Expression (7):

$$Pangle = |\tan^{-1}(Pb^*D1/Pa^*D1) - \tan^{-1}(Pb^*D2/Pa^*D2)| \quad (7)$$

In this process, in a case where the occurrence start point detecting section 11 determines that the pixel of interest is the occurrence start point when Conditional Expression (1) is satisfied so that the magnitude of the G pixel value of the pixel of interest is greater than the arbitrary saturation level threshold THsat, the specific directions D1 and D2 are not determined. In this case, for example, Pangle can be calculated for D1 and D2 of all the four directions, vertical, horizontal, and diagonal directions described above, and the greatest value of the calculated values of Pangle can be employed. Instead, Pangle can be calculated for D1 and D2 of all the four directions, and the average of the calculated values of Pangle can be employed.

The correction amount calculating section 17 calculates a correction amount Ca from Pangle. In a case where Pangle ranges from 0 to 360 degrees, for example, the correction amount Ca is increased as Pangle approaches 180 degrees, whereas the correction amount Ca is decreased as the Pangle is separate away from 180 degrees. In a case where the angle in the color space is expressed by a value ranging from 0 to 360 degrees as in the case of a hue circle, an appropriate correction amount can be calculated in a case where coloring is likely to be sensed by human vision, for example, in a case where Pangle is 180 degrees, where two colors are located on opposite sides. Calculating a correction amount that allows the color angle for the one direction to be equal to the color angle for the other direction eliminates the difference in the color angle after the correction, whereby a desired amount of correction made on coloring sensed by human vision can be calculated.

When the correction amount is calculated for all pixels, the correction performed by the aberration correcting section based on the correction amounts calculated from the color space information on the angle is performed, for example, in accordance with the following Expressions (8) to (10), where Pr, Pg, and Pb represent pre-correction pixel values as shown in FIG. 6, and Pr', Pg', and Pb' represent post-correction pixel values as shown in FIG. 7.

$$Pr'=Pr-Ca \quad (8)$$

$$Pg'=Pg \quad (9)$$

$$Pb'=Pb-Ca \quad (10)$$

The correction can instead be made in accordance with the following Expression (11), where Pa represents the angle for a pre-correction pixel value, and Pa' represents the angle for a post-correction pixel value.

$$Pa'=Pa-Ca \quad (11)$$

Another example of the correction made on the basis of color space information on the angle will be described below.

In the case where the specific color space is an HSV space, for example, the color space information calculating section 15 calculates Pangle 1 and Pangle 2 as the color space information on the angle in accordance with the following Expressions (12) and (13):

$$Pangle1=Ph_{D1} \quad (12)$$

$$Pangle2=Ph_{D2} \quad (13)$$

In the case where the specific color space is an L*a*b* space, the color space information calculating section 15 calculates Pangle 1 and Pangle 2 as the color space information on the angle in accordance with the following Expressions (14) and (15):

$$Pangle1=\tan^{-1}(Pb^*D1/Pa^*D1) \quad (14)$$

$$Pangle2=\tan^{-1}(Pb^*D2/Pa^*D2) \quad (15)$$

In this process, in a case where the occurrence start point detecting section 11 determines that the pixel of interest is the occurrence start point when Conditional Expression (1) is satisfied, the specific directions D1 and D2 are not determined. In this case, for example, the color space information calculating section 15 calculates Pangle1 and Pangle2 for D1 and D2 of all the four directions, vertical, horizontal, and diagonal directions described above, and the color space difference calculating section 16 employs the greatest absolute value of the difference between Pangle1 and Pangle2 as the difference in the color space information on the angle, whereby D1 and D2 showing the greatest absolute value can be the specific directions.

The absolute value Pangle of the difference in the color space information on the angle is calculated, for example, by Expression (16).

$$Pangle=|Pangle1-Pangle2| \quad (16)$$

The correction amount calculating section 17 calculates correction amounts Ca1 and Ca2 from Pangle, Pangle1, and Pangle2 in accordance, for example, with the following Expressions (17) to (20):

In a case where Pangle1 is greater than Pangle2, $$Ca1=Pangle \quad (17)$$

$$Ca2=0 \quad (18)$$

In a case where Pangle2 is greater than Pangle1, $$Ca1=0 \quad (19)$$

$$Ca2=Pangle \quad (20)$$

After all pixels in the input image have been processed, the aberration correcting section 4 uses the angle-based correction amounts calculated by the correction amount calculating section 17 to correct the axial chromatic aberration area.

In a case where the positions of pixels under correction are located in the direction D1, as shown in, for example, FIG. 8, the angle-based correction made by the aberration correcting section 4 can be expressed by the following Expressions (21) to (23), where Pr1, Pg1, and Pb1 represent pre-correction pixel values (FIG. 8) and Pr1', Pg1', and Pb1' represent post-correction pixel values (FIG. 9).

$$Pr1'=Pr-Ca1 \quad (21)$$

$$Pg1'=Pg \quad (22)$$

$$Pb1'=Pb-Ca1 \quad (23)$$

The correction can instead be made in accordance with the following Expression (24), where Pangle1 represents the angle for a pre-correction pixel value, and Pangle1' represents the angle for a post-correction pixel value:

$$Pangle1'=Pangle1-Ca1 \quad (24)$$

Similarly, in a case where the positions of pixels under correction are located in the direction D2, the correction can be made in accordance with the following Expressions (25) to (27), where Pr2, Pg2, and Pb2 represent pre-correction pixel values, and Pr2', Pg2', and Pb2' represent post-correction pixel values.

$$Pr2'=Pr-Ca2 \quad (25)$$

$$Pg2'=Pg \quad (26)$$

$$Pb2'=Pb-Ca2 \quad (27)$$

The correction can instead be made in accordance with the following Expression (28), where Pangle2 represents the angle for a pre-correction pixel value, and Pangle2' represents the angle for a post-correction pixel value.

$$Pangle2'=Pangle2-Ca2 \quad (28)$$

In the case where axial chromatic aberration is corrected in accordance with color space information on the angle, the correction described above is particularly effective in a case where image processing or any other processing is so performed that the difference in the angle for a specific color widens in the color space.

(Case where Correction is Made Based on Color Space Information on Strength)

The color space angle information calculating section 15 calculates color space information on the strength for each of two directions (D1, D2) held as information on the detection information by the occurrence start point detecting section 11 (step S6).

The color space angle difference calculating section 16 uses the calculated color space information on the strength to calculate the difference in the color space information (step S7).

Specifically, in the case where the specific color space is an HSV space, $Ps_{D1}$ and $Ps_{D2}$ are calculated as the color space information on the strength, and an absolute value Pstrength of the difference between $Ps_{D1}$ and $Ps_{D2}$ is calculated in accordance with the following Expression (29):

$$Pstrength=|Ps_{D1}-Ps_{D2}| \quad (29)$$

In the case where the specific color space is an L*a*b* space, Pa*D1, Pb*D2, Pa*D2, and Pb*D2 are calculated as the color space information on the strength, and an absolute value Pstrength of the difference associated with Pa*D1, Pb*D2, Pa*D2, and Pb*D2 is calculated in accordance with the following Expression (30):

$$Pstrength=|\sqrt{(Pa^*D1^2+Pb^*D1^2)}-\sqrt{(Pa^*D2^2+Pb^*D2^2)}| \quad (30)$$

In the case where the occurrence start point detecting section 11 determines that the pixel of interest is the occurrence start point when Conditional Expression (1) is satisfied, and the specific directions D1 and D2 are not determined, for example, Pstrength can be calculated for D1 and D2 of all the four directions, the vertical, horizontal, and diagonal directions described above, and the greatest Pstrength can be employed. D1 and D2 showing the greatest Pstrength can thus be the specific directions.

The correction amount calculating section 17 calculates a correction amount Cb from Pstrength in accordance with the following Expression (31):

$$Cb=K^*Pstrength \quad (31)$$

where K is an arbitrary constant.

After all pixels in the input image have been processed, the aberration correcting section 4 uses the strength-based correction amount calculated by the correction amount calculating section to correct the axial chromatic aberration area. For example the strength-based correction made by the aberration correcting section 4 can be expressed by the following Expressions (32) to (34), where Pr, Pg, and Pb represent pre-correction pixel values as shown in FIG. 6 and Pr', Pg', and Pb' represent post-correction pixel values as shown in FIG. 7.

$$Pr'=Pr-Cb \quad (32)$$

$$Pg'=Pg \quad (33)$$

$$Pb'=Pb-Cb \quad (34)$$

The correction can instead be made in accordance with the following Expression (35), where Ps represents the strength for a pre-correction pixel value, and Ps' represents the strength for a post-correction pixel value.

$$Ps'=Ps-Cb \quad (35)$$

A greater correction amount is calculated in correspondence with a greater absolute value of the difference in color strength, and a smaller correction amount is calculated in correspondence with a smaller absolute value, whereby an appropriate correction amount can be calculated in a case where the difference in the color strength is large so that the coloring is likely to be sensed by human vision.

Further, calculating the correction amount that allows the color strength for the one direction to be equal to the color strength for the other direction eliminates the difference in color strength after the correction, whereby a desired amount of correction made on coloring sensed by human vision can be calculated.

Another example of the correction made on the basis of color space information on the strength will subsequently be described. In the case where the specific color space is an HSV space, for example, the color space information calculating section 15 calculates Pstrength1 and Pstrength2 as the color space information on the strength in accordance with the following Expressions (36) and (37):

$$Pstrength1=Ps_{D1} \quad (36)$$

$$Pstrength2=Ps_{D2} \quad (37)$$

In the case where the specific color space is an L*a*b* space, the color space information calculating section 15 calculates Pstrength1 and Pstrength2 as the color space information on the strength in accordance with the following Expressions (38) and (39):

$$Pstrength1=\sqrt{(Pa^*D1^2+Pb^*D1^2)} \quad (38)$$

$$Pstrength2=\sqrt{(Pa^*D2^2+Pb^*D2^2)} \quad (39)$$

In this process, in the case where the occurrence start point detecting section 11 determines that the pixel of interest is the occurrence start point when Conditional Expression (1) is satisfied, and the specific directions D1 and D2 are not determined, for example, the color space information calculating section 15 calculates Pstrength1 and Pstrength2 for D1 and D2 of all the four directions, the vertical, horizontal, and diagonal directions described above, and the color space difference calculating section 16 employs the greatest absolute value of the difference between Pstrength1 and Pstrength2 as the difference in the color space information on the strength. D1 and D2 showing the greatest absolute value can thus be the specific directions.

For example, the absolute value Pstrength of the difference in the color space information on the strength is calculated by the following Expression (40):

$$Pstrength=|Pstrength1-Pstrength2| \quad (40)$$

The correction amount calculating section 17 calculates correction amounts Cb1 and Cb2 from Pstrength, Pstrength1, and Pstrength2 in accordance, for example, with the following Expressions (41) to (44):

In a case where Pstrength1 is greater than Pstrength2, $$Cb1=Pstrength \quad (41)$$

$$Cb2=0 \quad (42)$$

In a case where Pstrength2 is greater than Pstrength1, $$Cb1=0 \quad (43)$$

$$Cb2=Pstrength \quad (44)$$

After all pixels in the input image have been processed, the aberration correcting section 4 uses the strength-based correction amounts calculated by the correction amount calculating section 17 to correct the axial chromatic aberration area.

In the case where the positions of pixels under correction are located in the direction D1, as shown, for example, in FIG. 8, the strength-based correction made by the aberration correcting section 4 can be expressed by the following Expressions (45) to (47), where Pr1, Pg1, and Pb1 represent pre-correction pixel values (FIG. 8), and Pr1', Pg1', and Pb1' represent post-correction pixel values (FIG. 9).

$$Pr1'=Pr-Cb1 \quad (45)$$

$$Pg1'=Pg \quad (46)$$

$$Pb1'=Pb-Cb1 \quad (47)$$

The correction can instead be made in accordance with the following Expression (48), where Pstrength1 represents the strength for a pre-correction pixel value, and Pstrength1' represents the strength for a post-correction pixel value.

$$P\text{strength}1' = P\text{strength}1 - Cb1 \qquad (48)$$

Similarly, in the case where the positions of pixels under correction are located in the direction D2, the correction can be made in accordance with the following Expressions (49) to (51), where Pr2, Pg2, and Pb2 represent pre-correction pixel values, and Pr2', Pg2', and Pb2' represent post-correction pixel values.

$$Pr2' = Pr - Cb2 \qquad (49)$$

$$Pg2' = Pg \qquad (50)$$

$$Pb2' = Pb - Cb2 \qquad (51)$$

The correction can instead be made in accordance with the following Expression (52), where Pstrength2 represents the strength for a pre-correction pixel value, and Pstrength2' represents the strength for a post-correction pixel value.

$$P\text{strength}2' = P\text{strength}2 - Cb2 \qquad (52)$$

In the case where axial chromatic aberration is corrected in accordance with color space information on the strength, the correction described above is particularly effective in a case where image processing or any other processing is so performed that the difference in the strength for a specific color widens in the color space.

(Case where Correction is Made Based on Color Space Information on Brightness)

The color space angle information calculating section 15 calculates color space information on the lightness for each of two directions (D1, D2) held as information on the detection information by the occurrence start point detecting section 11 (step S6).

The color space angle difference calculating section 16 uses the calculated color space information on the lightness to calculate the difference in the color space information (step S7).

Specifically, in the case where the specific color space is an HSV space, $Pv_{D1}$ and $Pv_{D2}$ are calculated as the color space information on the lightness, and an absolute value Plightness of the difference between $Pv_{D1}$ and $Pv_{D2}$ is calculated in accordance with the following Expression (53):
The absolute value Plightness of the difference between the two lightness values in the color space is expressed by the following Expression:

$$P\text{lightness} = |Pv_{D1} - Pv_{D2}| \qquad (53)$$

In the case where the specific color space is an L*a*b* space, Pl*D1 and Pl*D2 are calculated as the color space information on the lightness, and an absolute value Plightness of the difference between Pl*D1 and Pl*D2 is calculated in accordance with the following Expression (54):

$$P\text{lightness} = |Pl^*D1 - Pl^*D2| \qquad (54)$$

In the case where the occurrence start point detecting section 11 determines that the pixel of interest is the occurrence start point when Conditional Expression (1) is satisfied, the specific directions D1 and D2 are not determined, for example, Plightness can be calculated for D1 and D2 of all the four directions, the vertical, horizontal, and diagonal directions described above, and the greatest Plightness can be employed. D1 and D2 showing the greatest Pstrength can thus be the specific directions.

The correction amount calculating section 17 calculates a correction amount Cc from Plightness in accordance with the following expression:

$$Cc = K^* P\text{lightness} \qquad (55)$$

where K is an arbitrary constant.

After all pixels in the input image have been processed, the aberration correcting section 4 uses the lightness-based correction amount calculated by the correction amount calculating section to correct the axial chromatic aberration area.

The correction made by the aberration correcting section can be expressed by the following Expressions (56) to (58), where Pr', Pg', and Pb' represent post-correction pixel values, as shown in FIG. 7.

$$Pr' = Pr - Cc \qquad (56)$$

$$Pg' = Pg \qquad (57)$$

$$Pb' = Pb - Cc \qquad (58)$$

The correction can instead be made in accordance with the following Expression (59), where Pl represents the brightness for a pre-correction pixel value, and Pl' represents the brightness for a post-correction pixel value.

$$Pl' = Pl - Cc \qquad (59)$$

A greater correction amount is calculated in correspondence with a greater absolute value of the difference in color lightness, and a smaller correction amount is calculated in correspondence with a smaller absolute value, whereby an appropriate correction amount can be calculated in a case where the difference in the color lightness is large so that the coloring is likely to be sensed by human vision.

Further, calculating the correction amount that allows the color lightness for the one direction to be equal to the color lightness for the other direction eliminates the difference in color lightness after the correction, whereby a desired amount of correction made on coloring sensed by human vision can be calculated.

Another example of the correction made on the basis of color space information on the lightness will be subsequently described. In the case where the specific color space is an HSV space, for example, the color space information calculating section 15 calculates Plightness1 and Plightness2 as the color space information on the lightness in accordance with the following Expressions (60) and (61):

$$P\text{lightness}1 = Pv_{D1} \qquad (60)$$

$$P\text{lightness}2 = Pv_{D2} \qquad (61)$$

In the case where the specific color space is an L*a*b* space, Plightness1 and Plightness2 are calculated as the color space information on the lightness in accordance with the following Expressions (62) and (63):

$$P\text{lightness}1 = Pl^*D1 \qquad (62)$$

$$P\text{lightness}2 = Pl^*D2 \qquad (63)$$

In this process, in the case where the occurrence start point detecting section 11 determines that the pixel of interest is the occurrence start point when Conditional Expression (1) is satisfied, and the specific directions D1 and D2 are not determined, for example, the color space information calculating section 15 calculates Plightness1 and Plightness2 for D1 and D2 of all the four directions, the vertical, horizontal, and diagonal directions described above, and the color space difference calculating section 16 employs the greatest absolute value of the difference between Plightness1 and Plightness2 as the difference in the color space information on the lightness. D1 and D2 showing the greatest absolute value can thus be the specific directions.

For example, the absolute value Plightness of the difference in the color space information on the lightness is expressed by the following Expression (64):

$$Plightness=|Plightness1-Plightness2| \quad (64)$$

The correction amount calculating section 17 calculates correction amounts Cc1 and Ccb2 from Plightness, Plightness1, and Plightness2 in accordance, for example, with the following Expressions (65) to (68):

In a case where Plightness1 is greater than Plightness2, $$Cc1=Plightness \quad (65)$$

$$Cc2=0 \quad (66)$$

In a case where Plightness2 is greater than Plightness1, $$Cc1=0 \quad (67)$$

$$Cc2=Plightness \quad (68)$$

After all pixels in the input image have been processed, the aberration correcting section 4 uses the lightness-based correction amounts calculated by the correction amount calculating section 17 to correct the axial chromatic aberration area. In the case where the positions of pixels under correction are located in the direction D1, as shown in, for example, FIG. 8, the lightness-based correction made by the aberration correcting section 4 can be expressed by the following Expressions (69) to (71), where Pr1, Pg1, and Pb1 represent pre-correction pixel values (FIG. 8), and Pr1', Pg1', and Pb1' represent post-correction pixel values (FIG. 9).

$$Pr1'=Pr-Cc1 \quad (69)$$

$$Pg1'=Pg \quad (70)$$

$$Pb1'=Pb-Cc1 \quad (71)$$

The correction can instead be made in accordance with the following Expression (72), where Plightness1 represents the brightness for a pre-correction pixel value, and Plightness1' represents the strength for a post-correction pixel value.

$$Plightness1'=Plightness1-Cc1 \quad (72)$$

Similarly, in the case where the positions of pixels under correction are located in the direction D2, the correction can be made in accordance with the following Expressions (73) to (75), where Pr2, Pg2, and Pb2 represent pre-correction pixel values, and Pr2', Pg2', and Pb2' represent post-correction pixel values.

$$Pr2'=Pr-Cc2 \quad (73)$$

$$Pg2'=Pg \quad (74)$$

$$Pb2'=Pb-Cc2 \quad (75)$$

The correction can instead be made in accordance with the following Expression (76), where Plightness2 represents the brightness for a pre-correction pixel value, and Plightness2' represents the brightness for a post-correction pixel value.

$$Plightness2'=Plightness2-Cc2 \quad (76)$$

In the case where axial chromatic aberration is corrected in accordance with color space information on the lightness, the correction described above is particularly effective in a case where image processing or any other processing is so performed that the difference in the lightness for a specific color widens in the color space.

(Case where Correction is Made Based on Color Space Information on Angle and Strength)

The color space angle information calculating section 15 calculates color space information on the angle and strength for each of two directions (D1, D2) held as information on the detection information by the occurrence start point detecting section 11 (step S6).

The color space angle difference calculating section 16 uses the color space information on the calculated angle and strength to calculate the difference in the color space information (step S7).

The correction amount calculating section 17 calculates the correction amount Ca based on the angle described above and the correction amount Cb based on the strength described above and calculates a correction amount Cab based on the angle and strength on the basis of the two correction amounts in accordance, for example, with the following Expression (77):

$$Cab=Ca+Cb \quad (77)$$

After all pixels in the input image have been processed, the aberration correcting section 4 uses the angle-and-strength-based correction amount Cab calculated by the correction amount calculating section 17 to correct the axial chromatic aberration area. The correction made by the aberration correcting section 4 is made in accordance with the following Expressions (78) to (80), where Pr, Pg, and Pb represent pre-correction pixel values as shown in FIG. 6 and Pr', Pg', and Pb' represent post-correction pixel values as shown in FIG. 7.

$$Pr'=Pr-Cab \quad (78)$$

$$Pg'=Pg \quad (79)$$

$$Pb'=Pb-Cab \quad (80)$$

The correction can instead be made in accordance with the following Expression (81), where Pa represents the angle for a pre-correction pixel value, and Pa' represents the angle for a post-correction pixel value.

$$Pa'=Pa-Ca \quad (81)$$

The correction can still instead be made in accordance with the following Expression (82), where Ps represents the strength for a pre-correction pixel value, and Ps' represents the strength for a post-correction pixel value.

$$Ps'=Ps-Cb \quad (82)$$

Another example of the correction made on the basis of color space information on the angle or strength will be subsequently described.

The correction amount calculating section 17 can calculate the correction amounts Ca1, Ca2, and Cb1, Cb2 in accordance, for example, with Expressions (17) to (20) and use them to calculate correction amounts Cab1 and Cab2 based on the angle and strength in accordance, for example, with the following Expressions (83) and (84). The calculation method is, for example, as follows:

$$Cab1=Ca1+Cb1 \quad (83)$$

$$Cab2=Ca2+Cb2 \quad (84)$$

After all pixels in the input image have been processed, the aberration correcting section 4 uses the angle-based correction amounts calculated by the correction amount calculating section 17 to correct the axial chromatic aberration area.

In the case where the positions of the pixels under correction are located in the direction D1, as shown, for example, in FIG. 8, the angle-based correction made by the aberration correcting section 4 can be expressed by the following Expressions (85) to (87), where Pr1, Pg1, and Pb1 represent pre-correction pixel values (FIG. 8), and Pr1', Pg1', and Pb1' represent post-correction pixel values (FIG. 9).

$$Pr1'=Pr-Cab1 \tag{85}$$

$$Pg1'=Pg \tag{86}$$

$$Pb1'=Pb-Cab1 \tag{87}$$

The correction can instead be made in accordance with the following Expression (88), where Pangle1 represents the angle for a pre-correction pixel value, and Pangle1' represents the angle for a post-correction pixel value.

$$Pangle1'=Pangle1-Cb1 \tag{88}$$

The correction can still instead be made in accordance with the following Expression (89), where Pstrength1 represents the strength for a pre-correction pixel value, and Pstrength1' represents the strength for a post-correction pixel value.

$$Pstrength1'=Pstrength1-Cb1 \tag{89}$$

Similarly, in the case where the positions of the pixels under correction are located in the direction D2, the correction can be made in accordance with the following Expressions (90) to (92), where Pr2, Pg2, and Pb2 represent pre-correction pixel values, and Pr2', Pg2', and Pb2' represent post-correction pixel values.

$$Pr2'=Pr-Cab2 \tag{90}$$

$$Pg2'=Pg \tag{91}$$

$$Pb2'=Pb-Cab2 \tag{92}$$

The correction can instead be made in accordance with the following Expression (93), where Pangle2 represents the angle for a pre-correction pixel value, and Pangle2' represents the angle for a post-correction pixel value.

$$Pangle2'=Pangle2-Cb2 \tag{93}$$

The correction can still instead be made in accordance with the following Expression (94), where Pstrength2 represents the strength for a pre-correction pixel value, and Pstrength2' represents the strength for a post-correction pixel value.

$$Pstrength2'=Pstrength2-Cb2 \tag{94}$$

In the case where axial chromatic aberration is corrected in accordance with color space information on the angle and strength, the correction described above is particularly effective in a case where other image processing or any other processing is so performed that the difference in the angle and the difference in the strength for a specific color widen in the color space.

(Case where Correction is Made Based on Color Space Information on Angle and Lightness)

The color space angle information calculating section 15 calculates color space information on the angle and lightness for each of two directions (D1, D2) held as information on the detection information by the occurrence start point detecting section 11 (step S6).

The color space angle difference calculating section 16 uses the calculated color space information on the angle and lightness to calculate the difference in the color space information (step S7).

The angle-based correction amount Ca and the lightness-based correction amount Cc calculated by the correction amount calculating section 17 are used to calculate a correction amount Cac based on the angle and lightness in accordance, for example, with the following Expression (95):

$$Cac=Ca+Cc \tag{95}$$

After all pixels in the input image have been processed, the aberration correcting section 4 uses the angle-and-lightness-based correction amount Cac calculated by the correction amount calculating section 17 to correct the axial chromatic aberration area. The correction made by the aberration correcting section 4 is made in accordance with the following Expressions (96) to (98), where Pr, Pg, and Pb represent pre-correction pixel values as shown in FIG. 6 and Pr', Pg', and Pb' represent post-correction pixel values as shown in FIG. 7.

$$Pr'=Pr-Cac \tag{96}$$

$$Pg'=Pg \tag{97}$$

$$Pb'=Pb-Cac \tag{98}$$

The correction can instead be made in accordance with the following Expression (99), where Pa represents the angle for a pre-correction pixel value, and Pa' represents the angle for a post-correction pixel value.

$$Pa'=Pa-Ca \tag{99}$$

The correction can still instead be made in accordance with the following Expression (100), where Pl represents the brightness for a pre-correction pixel value, and Pl' represents the brightness for a post-correction pixel value.

$$Pl'=Pl-Cc \tag{100}$$

Another example of the correction made on the basis of color space information on the angle and lightness will be subsequently described. The correction amount calculating section 17 can calculate the correction amounts Ca1 and Ca2 based on the angle and the correction amounts Cc1 and Cc2 based on the lightness and then use them to calculate correction amounts Cac1 and Cac2 based on the angle and lightness in accordance, for example, with the following expressions:

$$Cac1=Ca1+Cc1 \tag{101}$$

$$Cac2=Ca2+Cc2 \tag{102}$$

After all pixels in the input image have been processed, the aberration correcting section 4 uses the angle-and-lightness based correction amounts calculated by the correction amount calculating section 17 to correct the axial chromatic aberration area. In the case where the positions of the pixels under correction are located in the direction D1, as shown in, for example, FIG. 8, the angle-and-lightness based correction made by the aberration correcting section 4 can be expressed by the following Expressions (103) to (105), where Pr1, Pg1, and Pb1 represent pre-correction pixel values (FIG. 8) and Pr1', Pg1', and Pb1' represent post-correction pixel values (FIG. 9).

$$Pr1'=Pr-Cac1 \tag{103}$$

$$Pg1'=Pg \tag{104}$$

$$Pb1'=Pb-Cac1 \quad (105)$$

The correction can instead be made in accordance with the following Expression (106), where Pangle1 represent the angle for a pre-correction pixel value, and Pangle1' represents the angle for a post-correction pixel value.

$$Pangle1'=Pangle1-Cb1 \quad (106)$$

The correction may still instead be made in accordance with the following expression, where Plightness1 represents the brightness for a pre-correction pixel value, and Plightness1' represents the brightness for a post-correction pixel value.

$$Plightness1'=Plightness1-Cc1 \quad (107)$$

Similarly, in the case where the positions of the pixels under correction are located in the direction D2, the correction can be made in accordance with the following Expressions (108) to (110), where Pr2, Pg2, and Pb2 represent pre-correction pixel values, and Pr2', Pg2', and Pb2' represent post-correction pixel values (FIG. 9).

$$Pr2'=Pr-Cac2 \quad (108)$$

$$Pg2'=Pg \quad (109)$$

$$Pb2'=Pb-Cac2 \quad (110)$$

The correction can instead be made in accordance with the following Expression (111), where Pangle2 represents the angle for a pre-correction pixel value, and Pangle2' represents the angle for a post-correction pixel value.

$$Pangle2'=Pangle2-Cb2 \quad (111)$$

The correction can instead be made in accordance with the following Expression (112), where Plightness2 represents the brightness for a pre-correction pixel value, and Plightness2' represents the brightness for a post-correction pixel value.

$$Plightness2'=Plightness2-Cc2 \quad (112)$$

In the case where axial chromatic aberration is corrected in accordance with color space information on the angle and lightness, the correction described above is particularly effective in a case where image processing or any other processing is so performed that the difference in the angle and the difference in the lightness for a specific color widen in the color space.

(Case where Correction is Made Based on Color Space Information on Strength and Lightness)

The color space angle information calculating section 15 calculates color space information on the strength and lightness for each of two directions (D1, D2) held as information on the detection information by the occurrence start point detecting section 11 (step S6).

The color space angle difference calculating section 16 uses the calculated color space information on the strength and lightness to calculate the difference in the color space information (step S7).

The strength-based correction amount Cb and the lightness-based correction amount Cc calculated by the correction amount calculating section 17 are used to calculate a correction amount Cbc based on the strength and lightness in accordance, for example, with the following Expression (113):

$$Cbc=Cb+Cc \quad (113)$$

After all pixels in the input image have been processed, the aberration correcting section 4 uses the strength-and-lightness-based correction amount Cac calculated by the correction amount calculating section 17 to correct the axial chromatic aberration area.

The correction made by the aberration correcting section 4 is made in accordance with the following Expressions (114) to (116), where Pr, Pg, and Pb represent pre-correction pixel values as shown in FIG. 6, and Pr', Pg', and Pb' represent post-correction pixel values as shown in FIG. 7.

$$Pr'=Pr-Cbc \quad (114)$$

$$Pg'=Pg \quad (115)$$

$$Pb'=Pb-Cbc \quad (116)$$

The correction can instead be made in accordance with the following Expression (117), where Ps represents the strength for a pre-correction pixel value, and Ps' represents the strength for a post-correction pixel value.

$$Ps'=Ps-Cb \quad (117)$$

The correction can still instead be made in accordance with the following Expression (118), where Pl represents the brightness for a pre-correction pixel value, and Pl' represents the brightness for a post-correction pixel value.

$$Pl'=Pl-Cc \quad (118)$$

Another example of the correction made on the basis of color space information on the strength and lightness will be subsequently described. The correction amount calculating section 17 calculates the correction amounts Cb1 and Cb2 based on the strength and the correction amounts Cc1 and Cc2 based on the lightness and uses them to calculate correction amounts Cbc1 and Cbc2 based on the strength and lightness in accordance, for example, with the following expressions (119) and (120):

$$Cbc1=Cb1+Cc1 \quad (119)$$

$$Cbc2=Cb2+Cc2 \quad (120)$$

After all pixels in the input image have been processed, the aberration correcting section 4 uses the strength-and-lightness-based correction amounts calculated by the correction amount calculating section 17 to correct the axial chromatic aberration area. In the case where the positions of the pixels under correction are located in the direction D1, as shown in, for example, FIG. 8, the strength-and-lightness-based correction made by the aberration correcting section 4 can be expressed by the following Expressions (121) to (123), where Pr1, Pg1, and Pb1 represent pre-correction pixel values (FIG. 8), and Pr1', Pg1', and Pb1' represent post-correction pixel values (FIG. 9).

$$Pr1'=Pr-Cbc1 \quad (121)$$

$$Pg1'=Pg \quad (122)$$

$$Pb1'=Pb-Cbc1 \quad (123)$$

The correction can instead be made in accordance with the following Expression (124), where Pstrength1 represents the strength for a pre-correction pixel value, and Pstrength1' represents the strength for a post-correction pixel value.

$$Pstrength1'=Pstrength1-Cb1 \quad (124)$$

The correction can still instead be made in accordance with the following Expression (125), where Plightness1 represents the brightness for a pre-correction pixel value, and Plightness1' represents the brightness for a post-correction pixel value.

$$Plightness1' = Plightness1 - Cc1 \quad (125)$$

Similarly, in the case where the positions of the pixels under correction are located in the direction D2, the correction can be made in accordance with the following Expressions (126) to (128), where Pr2, Pg2, and Pb2 represent pre-correction pixel values, and Pr2', Pg2', and Pb2' represent post-correction pixel values.

$$Pr2' = Pr - Cbc2 \quad (126)$$

$$Pg2' = Pg \quad (127)$$

$$Pb2' = Pb - Cbc2 \quad (128)$$

The correction can instead be made in accordance with the following Expression (129), where Pstrength2 represents the strength for a pre-correction pixel value, and Pstrength2' represents the strength for a post-correction pixel value.

$$Pstrength2' = Pstrength2 - Cb2 \quad (129)$$

The correction can still instead be made in accordance with the following Expression (130), where Plightness2 represents the brightness for a pre-correction pixel value, and Plightness2' represents the brightness for a post-correction pixel value.

$$Plightness2' = Plightness2 - Cc2 \quad (130)$$

In the case where axial chromatic aberration is corrected in accordance with color space information on the strength and lightness, the correction described above is particularly effective in a case where image processing or any other processing is so performed that the difference in the strength and the difference in the lightness for a specific color widen in the color space.

(Case where Correction is Made Based on Color Space Information on Angle, Strength and Lightness)

The color space angle information calculating section 15 calculates color space information on the angle, strength, and lightness for each of two directions (D1, D2) held as information on the detection information by the occurrence start point detecting section 11 (step S6).

The color space angle difference calculating section 16 uses the calculated color space information on the angle, strength, and lightness to calculate the difference in the color space information (step S7).

The angle-based correction amount Ca, the strength-based correction amount Cb, and the lightness-based correction amount Cc calculated by the correction amount calculating section are used to calculate an angle, strength, and lightness based correction amount Cabc in accordance, for example, with the following Expression (131):

$$Cabc = Ca + Cb + Cc \quad (131)$$

After all pixels in the input image have been processed, the aberration correcting section 4 uses the angle, strength, and brightness based correction amount Cabc calculated by the correction amount calculating section 17 to correct the axial chromatic aberration area. The correction made by the aberration correcting section 4 is made in accordance with the following Expressions (132) to (134), where Pr, Pg, and Pb represent pre-correction pixel values as shown in FIG. 6, and Pr', Pg', and Pb' represent post-correction pixel values as shown in FIG. 7.

$$Pr' = Pr - Cabc \quad (132)$$

$$Pg' = Pg \quad (133)$$

$$Pb' = Pb - Cabc \quad (134)$$

The correction can instead be made in accordance with the following Expression (135), where Pa represents the angle for a pre-correction pixel value, and Pa' represents the angle for a post-correction pixel value.

$$Pa' = Pa - Ca \quad (135)$$

The correction can still instead be made in accordance with the following Expression (136), where Ps represents the strength for a pre-correction pixel value, and Ps' represents the strength for a post-correction pixel value.

$$Ps' = Ps - Cb \quad (136)$$

Further, the correction can still instead be made in accordance with the following Expression (137), where Pl represents the brightness for a pre-correction pixel value, and Pl' represents the brightness for a post-correction pixel value.

$$Pl' = Pl - Cc \quad (137)$$

Another example of the correction made on the basis of color space information on the angle, strength, and lightness will be subsequently described. The anglebased correction amounts Ca1 and Ca2, the strength-based correction amounts Cb1 and Cb2, and the lightness-based correction amounts Cc1 and Cc2 calculated by the correction amount calculating section 17 are used to calculate correction amounts Cabc1 and Cabc2 based on the angle, strength, and lightness in accordance, for example, with the following expressions (138) and (139):

$$Cabc1 = Ca1 + Cb1 + Cc1 \quad (138)$$

$$Cabc2 = Ca2 + Cb2 + Cc2 \quad (139)$$

After all pixels in the input image have been processed, the aberration correcting section 4 uses the angle, strenglth, and lightness based correction amounts calculated by the correction amount calculating section 17 to correct the axial chromatic aberration area. In the case where the positions of the pixels under correction are located in the direction D1, as shown, for example, in FIG. 8, the angle, strenglth, and lightness based correction made by the aberration correcting section 4 can be expressed by the following Expressions (140) to (142), where Pr1, Pg1, and Pb1 represent pre-correction pixel values (FIG. 8), and Pr1', Pg1', and Pb1' represent post-correction pixel values (FIG. 9).

$$Pr1' = Pr - Cabc1 \quad (140)$$

$$Pg1' = Pg \quad (141)$$

$$Pb1' = Pb - Cabc1 \quad (142)$$

The correction can instead be made in accordance with the following Expression (143), where Pangle1 represents the angle for a pre-correction pixel value, and Pangle1' represents the angle for a post-correction pixel value.

$$Pangle1' = Pangle1 - Ca1 \quad (143)$$

The correction can instead be made in accordance with the following Expression (144), where Pstrength1 represents the strength for a pre-correction pixel value, and Pstrength1' represents the strength for a post-correction pixel value.

$$Pstrength1' = Pstrength1 - Cb1 \quad (144)$$

Further, the correction can instead be made in accordance with the following Expression (145), where Plightness1 represents the brightness for a pre-correction pixel value, and Plightness1' represents the brightness for a post-correction pixel value.

$$Pstrength1' = Pstrength1 - Cc1 \tag{145}$$

Similarly, in the case where the positions of the pixels under correction are located in the direction D2, the correction can be made in accordance with the following Expressions (146) to (148), where Pr2, Pg2, and Pb2 represent pre-correction pixel values, and Pr2', Pg2', and Pb2' represent post-correction pixel values.

$$Pr2' = Pr - Cabc2 \tag{146}$$

$$Pg2' = Pg \tag{147}$$

$$Pb2' = Pb - Cabc2 \tag{148}$$

The correction can instead be made in accordance with the following Expression (149), where Pangle2 represents the angle for a pre-correction pixel value, and Pangle2' represents the angle for a post-correction pixel value.

$$Pangle2' = Pangle2 - Ca2 \tag{149}$$

The correction can instead be made in accordance with the following Expression (150), where Pstrength2 represents the strength for a pre-correction pixel value, and Pstrength2' represents the strength for a post-correction pixel value.

$$Pstrength2' = Pstrength2 - Cb2 \tag{150}$$

The correction can instead be made in accordance with the following Expression (151), where Plightness2 represents the brightness for a pre-correction pixel value, and Plightness2' represents the brightness for a post-correction pixel value.

$$Plightness2' = Plightness2 - Cc2 \tag{151}$$

In the case where axial chromatic aberration is corrected in accordance with color space information based on the angle, strength, and lightness, the correction described above is particularly effective in a case where image processing or any other processing is so performed that the difference in the angle, the difference in the strength, and the difference in the lightness for a specific color widen in the color space.

As described above, the image processing apparatus according to the present embodiment and the image processing method carried out by the image processing apparatus can detect axial chromatic aberration also in at least one of a nearly saturated area and an area other than the nearly saturated area and correct the axial chromatic aberration on the basis of human vision characteristics.

Figure 10:
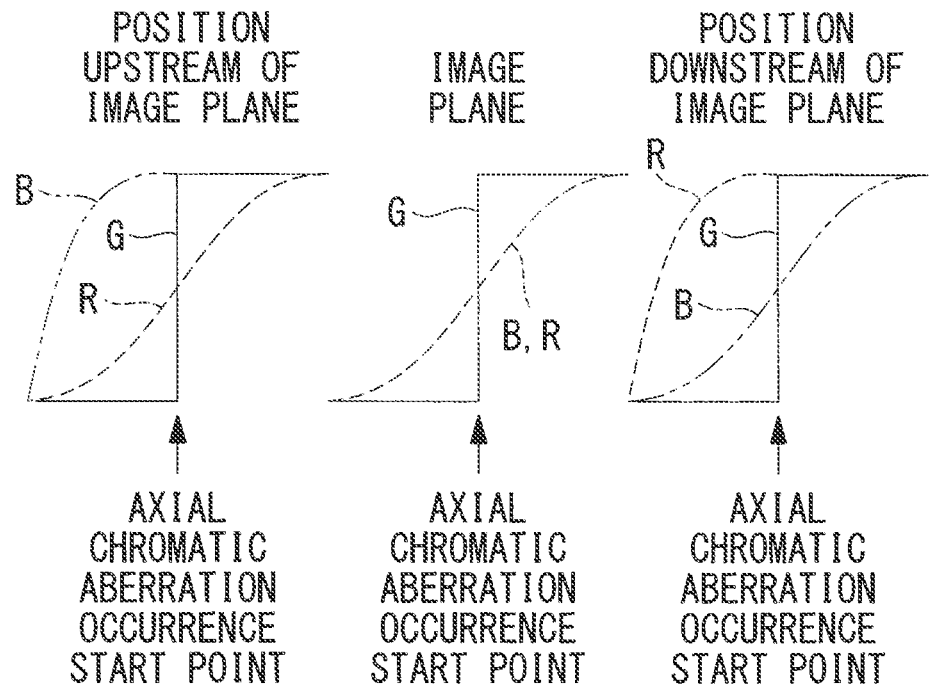
FIG. 10 shows a first example of a step edge in a case where axial chromatic aberration occurs in an aspect different from the aspect in FIG. 2.
Figure 11:
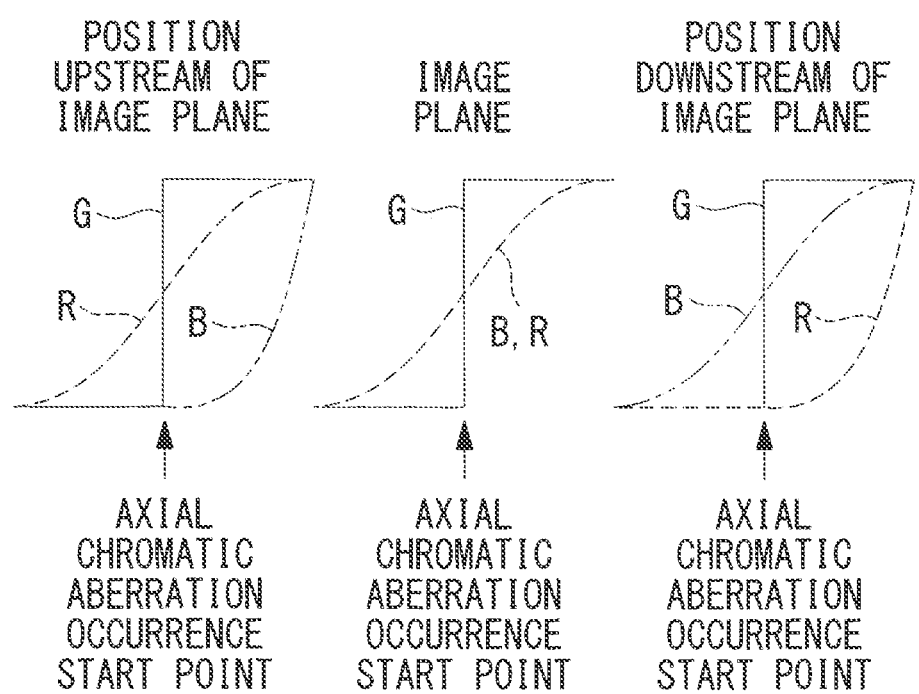
FIG. 11 shows a second example of the step edge in a case where axial chromatic aberration occurs in an aspect different from the aspect in FIG. 2.

In the image processing apparatus 1 according to the present embodiment, a pixel of interest is detected as the axial chromatic aberration occurrence start point when Conditional Expressions (2) to (5) described above are all satisfied. Instead, a pixel of interest may be detected as the axial chromatic aberration occurrence start point when Conditional Expressions (2) and (3) are satisfied or when Conditional Expressions (4) and (5) are satisfied, as shown in FIGS. 10 and 11.

The configuration described above allows detection of the axial chromatic aberration occurrence start point can be advantageously over a depth-direction range around the focus position.

Instead, when Conditional Expressions (2), (3), and (5) are all satisfied or when Conditional Expressions (3), (4), and (5) are all satisfied, the pixel of interest may be detected as the axial chromatic aberration occurrence start point.

The configuration described above allows a location where a purple fringe occurs in the other direction D2 and the sum of the R pixel values or the sum of the B pixel values is smaller than the sum of the G pixel values in the one direction D1 so that a color close to the color opposite purple in the hue circle is produced and therefore makes the purple fringe highly visible to be detected as the axial chromatic aberration occurrence start point.

Still instead, when Conditional Expressions (2), (3), and (4) are all satisfied or when Conditional Expressions (2), (4), and (5) are all satisfied, the pixel of interest may be detected as the axial chromatic aberration occurrence start point.

The configuration described above allows a location where a green fringe occurs in the one direction D1 and the sum of the R pixel values or the sum of the B pixel values is greater than the sum of the G pixel values in the other direction D2 so that a color close to the color opposite green in the hue circle is produced and therefore makes the green fringe highly visible to be detected as the axial chromatic aberration occurrence start point.

Still instead, when the sums of the pixel values calculated by Equation 1 satisfy all the following Conditional Expressions (152) to (155), the pixel of interest may be detected as the axial chromatic aberration occurrence start points.

$$Pg_{D1} + TH_{R1} > Pr_{D1} \tag{152}$$

$$Pg_{D2} - TH_{R2} < Pr_{D2} \tag{153}$$

$$Pg_{D1} + TH_{B1} > Pb_{D1} \tag{154}$$

$$Pg_{D2} - TH_{B2} < Pb_{D2} \tag{155}$$

where $TH_{R1}$, $TH_{R2}$, $TH_{B1}$, and $TH_{B2}$ are each an arbitrary constant.

Figure 12:
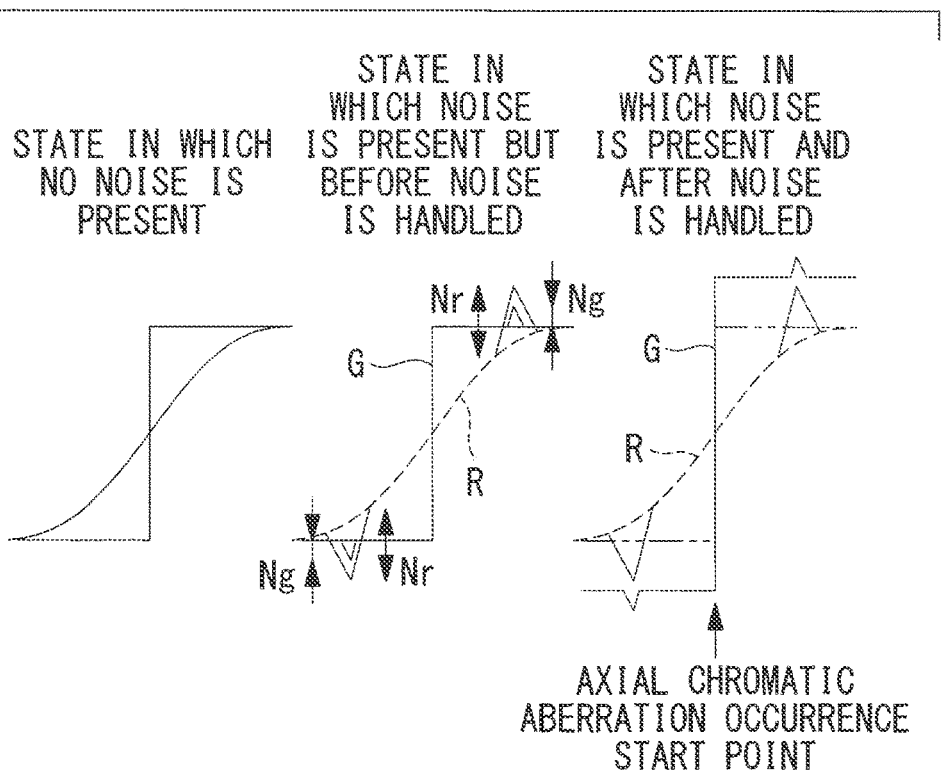
FIG. 12 shows an example of how to handle a case where an image signal contains noise as compared with a case where the image signal contains no noise and the state before the noise is handled.

$TH_{R1}$, $TH_{R2}$, $TH_{B1}$, and $TH_{B2}$ can, for example, each be the difference in standard deviation representing the amount of noise between G and R or G and B in the position of a pixel under processing, as shown in FIG. 12. Let $Nr_{D1}$, $Ng_{D1}$, $Nb_{D1}$, $Nr_{D2}$, $Ng_{D2}$, and $Nb_{D2}$ be the amount of noise in R, G, and B in the one direction D1 and the other direction D2, and $TH_{R1}$, $TH_{R2}$, $TH_{B1}$, and $TH_{B2}$ can be expressed by the following Expressions (156) to (159):

$$TH_{R1} = Nr_{D1} - Ng_{D1} \tag{156}$$

$$TH_{R2} = Nr_{D2} - Ng_{D2} \tag{157}$$

$$TH_{B1} = Nb_{D1} - Ng_{D1} \tag{158}$$

$$TH_{B2} = Nb_{D2} - Ng_{D2} \tag{159}$$

The configuration described above advantageously allows reduction in influence of the noise, whereby the axial chromatic aberration occurrence start point can be stably detected.

When the sums of the pixel values calculated by Equation 1 satisfy all the following Conditional Expressions (160) to (163), the pixel of interest may be detected as the axial chromatic aberration occurrence start point.

$$Pg_{D1} + TH_R > Pr_{D1} \tag{160}$$

$$Pg_{D2} + TH_R < Pr_{D2} \tag{161}$$

$$Pg_{D1} + TH_B > Pb_{D1} \tag{162}$$

$$Pg_{D2} + TH_B < Pb_{D2} \tag{163}$$

where $TH_R$ and $TH_B$ are each an arbitrary constant.

Figure 13:
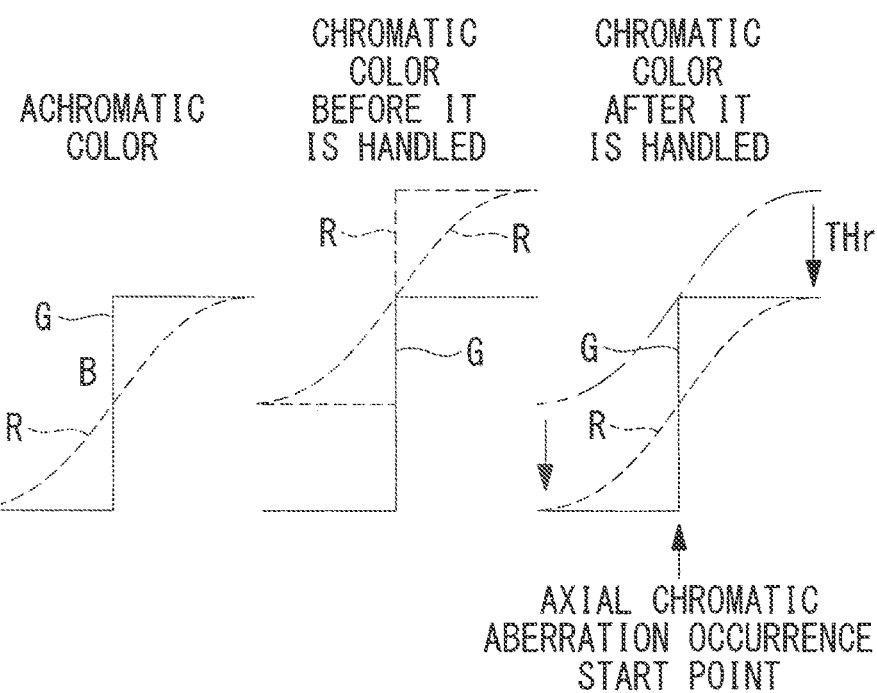
FIG. 13 shows an example of how to handle a chromatic step edge as compared with an achromatic step edge and the state before the chromatic step edge is handled.

The constant $TH_R$ and $TH_B$ can, for example, each be the difference in pixel value between G and R or G and B in the position of a pixel under processing, as shown in FIG. 13. Let Pr(0, 0), Pg(0, 0), and Pb(0, 0) be the R, G, and B pixel values of the pixel of interest, and $TH_R$ and $TH_B$ can be expressed by the following Expressions (164) and (165):

$$TH_R = Pg(0,0) - Pr(0,0) \quad (164)$$

$$TH_B = Pg(0,0) - Pb(0,0) \quad (165)$$

The configuration described above advantageously allows detection of an axial chromatic aberration occurrence start point that occurs on a colored subject instead of an achromatic subject.

When the sums of the pixel values calculated by Equation 1 satisfy all the following Conditional Expressions (166) to (169), the pixel of interest may be detected as the axial chromatic aberration occurrence start point:

$$Pg_{D1} > Pr_{D1} \times K_R \quad (166)$$

$$Pg_{D2} < Pr_{D2} \times K_R \quad (167)$$

$$Pg_{D1} > Pb_{D1} \times K_B \quad (168)$$

$$Pg_{D2} < Pb_{D2} \times K_B \quad (169)$$

where $K_R$ and $K_B$ are each an arbitrary constant.

Figure 14:
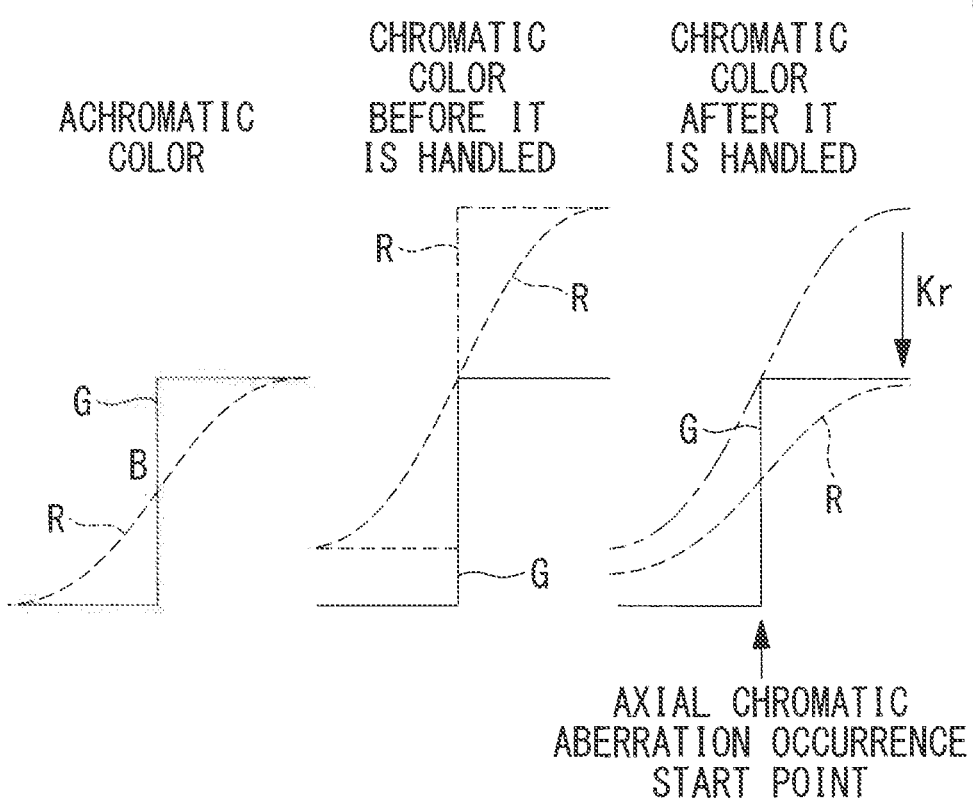
FIG. 14 shows another example of how to handle a chromatic step edge as compared with an achromatic step edge and the state before the chromatic step edge is handled.

The constant $K_R$ and $K_B$ can, for example, each be the ratio between G and R or G and B pixel values in the position of a pixel under processing, as shown in FIG. 14. Let $Pr(0, 0)$, $Pg(0, 0)$, and $Pb(0, 0)$ be the R, G, and B pixel values of the pixel of interest, and $K_R$ and $K_B$ can be expressed by the following Expressions (170) and (171):

$$K_R = Pg(0,0) / Pr(0,0) \quad (170)$$

$$K_B = Pg(0,0) / Pb(0,0) \quad (171)$$

The configuration described above also advantageously allows detection of an axial chromatic aberration occurrence start point that occurs on a colored subject instead of an achromatic subject.

Further, the present embodiment has been described with reference to the case where a full-color image that provides all RGB signal values at each pixel is inputted as the input image. Instead, the present embodiment may be applied to a case where what is called a Bayer image is inputted as the input image. In this case, the total pixel value calculating section 10 uses Equations 2 to 4 to calculate the total pixel values in the one direction D1.

Figure 15:
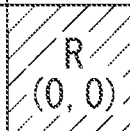
FIG. 15 shows a pixel arrangement in a case where an R component in an image acquired with a Bayer-arrangement imaging device forms the pixel of interest.

In a case where an R component forms the pixel of interest (hatched portion), as shown in FIG. 15, the total pixel values are calculated by the expressions indicated by Equations 2 and 3.

$$P_{rL} = \sum_{i=1}^{m} P(-2i, 0), \quad \{\text{Equation 2}\}$$

$$P_{gL} = \left\{ \sum_{i=1}^{m} P(-(2i-1), 0) + \sum_{i=1}^{m} P(-2i, -1) + \sum_{i=1}^{m} P(-2i, 1) \right\} / 3,$$

$$P_{bL} = \left\{ \sum_{i=1}^{m} P(-(2i-1), -1) + \sum_{i=1}^{m} P(-(2i-1), 1) \right\} / 2$$

$$P_{rR} = \sum_{i=1}^{m} P(2i, 0),$$

$$P_{gR} = \left\{ \sum_{i=1}^{m} P((2i-1), 0) + \sum_{i=1}^{m} P(2i, -1) + \sum_{i=1}^{m} P(2i, 1) \right\} / 3,$$

$$P_{bR} = \left\{ \sum_{i=1}^{m} P((2i-1), -1) + \sum_{i=1}^{m} P((2i-1), 1) \right\} / 2$$

$$P_{rT} = \sum_{i=1}^{m} P(0, -2i),$$

$$P_{gT} = \left\{ \sum_{i=1}^{m} P(0, -(2i-1)) + \sum_{i=1}^{m} P(1, -2i) + \sum_{i=1}^{m} P(-1, -2i) \right\} / 3,$$

$$P_{bT} = \left\{ \sum_{i=1}^{m} P(-1, -(2i-1)) + \sum_{i=1}^{m} P(1, -(2i-1)) \right\} / 2$$

$$P_{rB} = \sum_{i=1}^{m} P(0, 2i),$$

$$P_{gB} = \left\{ \sum_{i=1}^{m} P(0, (2i-1)) + \sum_{i=1}^{m} P(1, 2i) + \sum_{i=1}^{m} P(-1, 2i) \right\} / 3,$$

$$P_{bB} = \left\{ \sum_{i=1}^{m} P(-1, (2i-1)) + \sum_{i=1}^{m} P(1, (2i-1)) \right\} / 2$$

$$P_{rLT} = \sum_{i=1}^{m} P(-2i, -2i), \quad \{\text{Equation 3}\}$$

$$P_{gLT} = \left\{ \sum_{i=1}^{m} P(-i, -(i-1)) + \sum_{i=1}^{m} P(-(i-1), -i) \right\} / 2,$$

$$P_{bLT} = \sum_{i=1}^{m} P(-(2i-1), -(2i-1))$$

$$P_{rLB} = \sum_{i=1}^{m} P(-2i, 2i),$$

$$P_{gLB} = \left\{ \sum_{i=1}^{m} P(-i, (i-1)) + \sum_{i=1}^{m} P(-(i-1), i) \right\} / 2,$$

$$P_{bLB} = \sum_{i=1}^{m} P(-(2i-1), (2i-1))$$

$$P_{rRT} = \sum_{i=1}^{m} P(2i, -2i),$$

$$P_{gRT} = \left\{ \sum_{i=1}^{m} P(i, -(i-1)) + \sum_{i=1}^{m} P((i-1), -i) \right\} / 2,$$

$$P_{bRT} = \sum_{i=1}^{m} P((2i-1), -(2i-1))$$

$$P_{rRB} = \sum_{i=1}^{m} P(2i, 2i),$$

$$P_{gRB} = \left\{ \sum_{i=1}^{m} P(i, (i-1)) + \sum_{i=1}^{m} P((i-1), i) \right\} / 2,$$

$$P_{bRB} = \sum_{i=1}^{m} P((2i-1), (2i-1))$$

Figure 16:
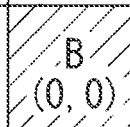
FIG. 16 shows a pixel arrangement in a case where a B component in an image acquired with a Bayer-arrangement imaging device forms the pixels of interest.

In a case where a B component forms the pixel of interest (hatched portion), as shown in FIG. 16, the total pixel values are calculated by the expressions indicated by Equations 4 and 5.

{Equation 4}

$$P_{rL} = \left\{\sum_{i=1}^{m} P(-(2i-1), -1) + \sum_{i=1}^{m} P(-(2i-1), 1)\right\}/2,$$

$$P_{gL} = \left\{\sum_{i=1}^{m} P(-(2i-1), 0) + \sum_{i=1}^{m} P(-2i, -1) + \sum_{i=1}^{m} P(-2i, 1)\right\}/3,$$

$$P_{bL} = \sum_{i=1}^{m} P(-2i, 0)$$

$$P_{rR} = \left\{\sum_{i=1}^{m} P((2i-1), -1) + \sum_{i=1}^{m} P((2i-1), 1)\right\}/2,$$

$$P_{gR} = \left\{\sum_{i=1}^{m} P((2i-1), 0) + \sum_{i=1}^{m} P(2i, -1) + \sum_{i=1}^{m} P(2i, 1)\right\}/3,$$

$$P_{bR} = \sum_{i=1}^{m} P(2i, 0)$$

$$P_{rT} = \left\{\sum_{i=1}^{m} P(-1, -(2i-1)) + \sum_{i=1}^{m} P(1, -(2i-1))\right\}/2,$$

$$P_{gT} = \left\{\sum_{i=1}^{m} P(0, -(2i-1)) + \sum_{i=1}^{m} P(1, -2i) + \sum_{i=1}^{m} P(-1, -2i)\right\}/3,$$

$$P_{bT} = \sum_{i=1}^{m} P(0, -2i)$$

$$P_{rB} = \left\{\sum_{i=1}^{m} P(-1, (2i-1)) + \sum_{i=1}^{m} P(1, (2i-1))\right\}/2,$$

$$P_{gB} = \left\{\sum_{i=1}^{m} P(0, (2i-1)) + \sum_{i=1}^{m} P(1, 2i) + \sum_{i=1}^{m} P(-1, 2i)\right\}/3,$$

$$P_{bB} = \sum_{i=1}^{m} P(0, 2i)$$

{Equation 5}

$$P_{rLT} = \sum_{i=1}^{m} P(-(2i-1), -(2i-1)),$$

$$P_{gLT} = \left\{\sum_{i=1}^{m} P(-i, -(i-1)) + \sum_{i=1}^{m} P(-(i-1), -i)\right\}/2,$$

$$P_{bLT} = \sum_{i=1}^{m} P(-2i, -2i)$$

$$P_{rLB} = \sum_{i=1}^{m} P(-(2i-1), (2i-1)),$$

$$P_{gLB} = \left\{\sum_{i=1}^{m} P(-i, (i-1)) + \sum_{i=1}^{m} P(-(i-1), i)\right\}/2,$$

$$P_{bLB} = \sum_{i=1}^{m} P(-2i, 2i)$$

$$P_{rRT} = \sum_{i=1}^{m} P((2i-1), -(2i-1)),$$

$$P_{gRT} = \left\{\sum_{i=1}^{m} P(i, -(i-1)) + \sum_{i=1}^{m} P((i-1), -i)\right\}/2,$$

$$P_{bRT} = \sum_{i=1}^{m} P(2i, -2i)$$

$$P_{rRB} = \sum_{i=1}^{m} P((2i-1), (2i-1)),$$

$$P_{gRB} = \left\{\sum_{i=1}^{m} P(i, (i-1)) + \sum_{i=1}^{m} P((i-1), i)\right\}/2,$$

$$P_{bRB} = \sum_{i=1}^{m} P(2i, 2i)$$

In a case where a GR component forms the pixel of interest (hatched portion), as shown in FIG. 17, the total pixel values are calculated by the expressions indicated by Equations 6 and 7.

{Equation 6}

$$P_{rL} = \sum_{i=1}^{m} P(-(2i-1), 0),$$

$$P_{gL} = \left\{\sum_{i=1}^{m} P(-2i, 0) + \sum_{i=1}^{m} P(-(2i-1), -1) + \sum_{i=1}^{m} P(-(2i-1), 1)\right\}/3,$$

$$P_{bL} = \left\{\sum_{i=1}^{m} P(-2i, -1) + \sum_{i=1}^{m} P(-2i, 1)\right\}/2$$

$$P_{rR} = \sum_{i=1}^{m} P((2i-1), 0),$$

$$P_{gR} = \left\{\sum_{i=1}^{m} P(2i, 0) + \sum_{i=1}^{m} P((2i-1), -1) + \sum_{i=1}^{m} P((2i-1), 1)\right\}/3,$$

$$P_{bR} = \left\{\sum_{i=1}^{m} P(2i, -1) + \sum_{i=1}^{m} P(2i, 1)\right\}/2$$

$$P_{rT} = \left\{\sum_{i=1}^{m} P(-1, -2i) + \sum_{i=1}^{m} P(1, -2i)\right\}/2,$$

$$P_{gT} = \left\{\sum_{i=1}^{m} P(0, -2i) + \sum_{i=1}^{m} P(1, -(2i-1)) + \sum_{i=1}^{m} P(-1, -(2i-1))\right\}/3,$$

$$P_{bT} = \sum_{i=1}^{m} P(0, -(2i-1))$$

$$P_{rB} = \left\{\sum_{i=1}^{m} P(-1, 2i) + \sum_{i=1}^{m} P(1, 2i)\right\}/2,$$

$$P_{gB} = \left\{\sum_{i=1}^{m} P(0, 2i) + \sum_{i=1}^{m} P(1, (2i-1)) + \sum_{i=1}^{m} P(-1, (2i-1))\right\}/3,$$

$$P_{bB} = \sum_{i=1}^{m} P(0, (2i-1))$$

-continued $$P_{rLT} = \left\{\sum_{i=1}^{m} P(-(2i-1), -2(i-1)) + \sum_{i=1}^{m} P(-(2i-1), -2i)\right\}/2,$$ {Equation 7}

$$P_{gLT} = \sum_{i=1}^{m} P(-i, -i),$$

$$P_{bLT} = \left\{\sum_{i=1}^{m} P(-2i, -(2i-1)) + \sum_{i=1}^{m} P(-2(i-1), -(2i-1))\right\}/2$$

$$P_{rLB} = \left\{\sum_{i=1}^{m} P(-(2i-1), 2(i-1)) + \sum_{i=1}^{m} P(-(2i-1), 2i)\right\}/2,$$

$$P_{gLB} = \sum_{i=1}^{m} P(-i, i),$$

$$P_{bLB} = \left\{\sum_{i=1}^{m} P(-2i, (2i-1)) + \sum_{i=1}^{m} P(-2(i-1), (2i-1))\right\}/2$$

$$P_{rRT} = \left\{\sum_{i=1}^{m} P((2i-1), -2(i-1)) + \sum_{i=1}^{m} P((2i-1), -2i)\right\}/2,$$

$$P_{gRT} = \sum_{i=1}^{m} P(i, -i),$$

$$P_{bRT} = \left\{\sum_{i=1}^{m} P(2i, -(2i-1)) + \sum_{i=1}^{m} P(2(i-1), -(2i-1))\right\}/2$$

$$P_{rRB} = \left\{\sum_{i=1}^{m} P((2i-1), 2(i-1)) + \sum_{i=1}^{m} P((2i-1), 2i)\right\}/2,$$

$$P_{gRB} = \sum_{i=1}^{m} P(i, i),$$

$$P_{bRB} = \left\{\sum_{i=1}^{m} P(2i, (2i-1)) + \sum_{i=1}^{m} P(2(i-1), (2i-1))\right\}/2$$

Figure 18:
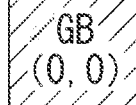
FIG. 18 shows a pixel arrangement in a case where a GB component in an image acquired with a Bayer-arrangement imaging device forms the pixel of interest.

In a case where a GB component forms the pixel of interest (hatched portion), as shown in FIG. 18, the total pixel values are calculated by the expressions indicated by Equation 8 and 9.

$$P_{rL} = \left\{\sum_{i=1}^{m} P(-2i, -1) + \sum_{i=1}^{m} P(-2i, 1)\right\}/2,$$ {Equation 8}

$$P_{gL} = \left\{\sum_{i=1}^{m} P(-2i, 0) + \sum_{i=1}^{m} P(-(2i-1), -1) + \sum_{i=1}^{m} P(-(2i-1), 1)\right\}/3,$$

$$P_{bL} = \sum_{i=1}^{m} P(-(2i-1), 0)$$

$$P_{rR} = \left\{\sum_{i=1}^{m} P(2i, -1) + \sum_{i=1}^{m} P(2i, 1)\right\}/2,$$

$$P_{gR} = \left\{\sum_{i=1}^{m} P(2i, 0) + \sum_{i=1}^{m} P((2i-1), -1) + \sum_{i=1}^{m} P((2i-1), 1)\right\}/3,$$

$$P_{bR} = \sum_{i=1}^{m} P((2i-1), 0)$$

$$P_{rT} = \sum_{i=1}^{m} P(0, -(2i-1)),$$

$$P_{gT} = \left\{\sum_{i=1}^{m} P(0, -2i) + \sum_{i=1}^{m} P(1, -(2i-1)) + \sum_{i=1}^{m} P(-1, -(2i-1))\right\}/3,$$

$$P_{bT} = \left\{\sum_{i=1}^{m} P(-1, -2i) + \sum_{i=1}^{m} P(1, -2i)\right\}/2$$

$$P_{rB} = \sum_{i=1}^{m} P(0, (2i-1)),$$

$$P_{gB} = \left\{\sum_{i=1}^{m} P(0, 2i) + \sum_{i=1}^{m} P(1, (2i-1)) + \sum_{i=1}^{m} P(-1, (2i-1))\right\}/3,$$

$$P_{bB} = \left\{\sum_{i=1}^{m} P(-1, 2i) + \sum_{i=1}^{m} P(1, 2i)\right\}/2$$

$$P_{rLT} = \left\{\sum_{i=1}^{m} P(-2i, -(2i-1)) + \sum_{i=1}^{m} P(-2(i-1), -(2i-1))\right\}/2,$$ {Equation 9}

$$P_{gLT} = \sum_{i=1}^{m} P(-i, -i),$$

$$P_{bLT} = \left\{\sum_{i=1}^{m} P(-(2i-1), -2(i-1)) + \sum_{i=1}^{m} P(-(2i-1), -2i)\right\}/2$$

$$P_{rLB} = \left\{\sum_{i=1}^{m} P(-2i, (2i-1)) + \sum_{i=1}^{m} P(-2(i-1), (2i-1))\right\}/2,$$

$$P_{gLB} = \sum_{i=1}^{m} P(-i, i),$$

$$P_{bLB} = \left\{\sum_{i=1}^{m} P(-(2i-1), 2(i-1)) + \sum_{i=1}^{m} P(-(2i-1), 2i)\right\}/2$$

$$P_{rRT} = \left\{\sum_{i=1}^{m} P(2i, -(2i-1)) + \sum_{i=1}^{m} P(2(i-1), -(2i-1))\right\}/2$$

$$P_{gRT} = \sum_{i=1}^{m} P(i, -i),$$

$$P_{bRT} = \left\{\sum_{i=1}^{m} P((2i-1), -2(i-1)) + \sum_{i=1}^{m} P((2i-1), -2i)\right\}/2$$

$$P_{rRB} = \left\{\sum_{i=1}^{m} P(2i, (2i-1)) + \sum_{i=1}^{m} P(2(i-1), (2i-1))\right\}/2,$$

$$P_{gRB} = \sum_{i=1}^{m} P(i, i),$$

$$P_{bRB} = \left\{\sum_{i=1}^{m} P((2i-1), 2(i-1)) + \sum_{i=1}^{m} P((2i-1), 2i)\right\}/2$$

The configuration described above allows detection of the axial chromatic aberration occurrence start point even in an image in which RGB pixel values are not simultaneously provided, whereby influence of an error in interpolation for the simultaneous provision at the time of detection of the axial chromatic aberration occurrence start point can be eliminated.

The image processing apparatus 1 according to the present embodiment is incorporated in and used with a stationary camera for broadcasting, an ENG camera, a consumer handy camera, a digital camera, and other products. The image processing apparatus 1 can also be used with an image signal correcting program (CG program), an image editing apparatus, and others that handle motion images. The image processing method according to the present embodiment can be used as an image processing program executed by a computer (personal computer, for example).

As a result, the following aspect is read by the above described embodiment of the present invention.

An aspect of the present invention relates to an image processing apparatus including a processor comprising hardware, the processor being configured to implement a total pixel value calculating process that sums pixel values of pixels, out of a plurality of pixels containing a pixel of interest in an input image and arranged in one line, arranged in one direction and another direction on opposite sides of the pixel of interest on a color basis, an occurrence start point detecting process that determines whether or not the pixel of interest is an axial chromatic aberration occurrence start point based on at least one of a result of the calculation performed by the total pixel value calculating process and the pixel value of the pixel of interest and detects the occurrence start point, an area determining process that determines a predetermined surrounding area around the pixel of interest detected as the occurrence start point to be an axial chromatic aberration area, a color space information calculating process that calculates color space information on the pixel of interest detected as the occurrence start point in a specific color space for the one direction and the other direction based on the result of the calculation performed by the total pixel value calculating process, a color space difference calculating process that calculates a difference between the color space information for the one direction and the color space information for the other direction calculated by the color space information calculating process, a correction amount calculating process that calculates a correction amount used to correct axial chromatic aberration in accordance with the difference calculated by the color space difference calculating process, and a correcting process that corrects the axial chromatic aberration area by using the correction amount.

According to the present aspect, the total pixel value calculating process calculates the sum of the pixel values of the pixels arranged along a straight line on opposite sides of the pixel of interest, and the occurrence start point detecting process determines whether the pixel of interest is the axial chromatic aberration occurrence start point on the basis of a result of the calculation or the pixel value of the pixel of interest to detect the occurrence start point. In a case where the pixel of interest is detected as the axial chromatic aberration occurrence start point, the color space information calculating process calculates the color space information on the pixel of interest in the specific color space for each of the one direction and the other direction, and the color space difference calculating process calculates the difference in the color space information. A correction amount calculated on the basis of the difference is used to correct the axial chromatic aberration area formed of the surrounding area around the pixel of interest. Calculating the correction amount in such a way that not only the pixel value of the pixel of interest but the pixel values of the pixels arranged along the straight line on opposite sides of the pixel of interest are evaluated as described above allows correction of axial chromatic aberration on the basis of human vision characteristics.

In the aspect described above, the color space information calculating process may calculate at least one of information on color angle, information on color strength, and information on color lightness as the color space information in the specific color space, the color space difference calculating process may calculate at least one of a difference in the color angle, a difference in the color strength, and a difference in the color lightness as the difference between the color space information for the one direction and the color space information for the other direction based on the result of the calculation performed by the color space information calculating process, and the correction amount calculating process may calculate the amount of correction of the axial chromatic aberration based on a result of the calculation performed by the color space difference calculating process.

The configuration described above allows calculation of an optimum correction amount according to the difference in the color angle, the difference in the color strength, or the difference in the color lightness in adjacent areas where a person is likely to sense axial chromatic aberration on the basis of human vision characteristics.

In the aspect described above, the occurrence start point detecting process may detect the pixel of interest as the axial chromatic aberration occurrence start point in a case where the pixel value of the pixel of interest is greater than a predetermined threshold, or in a case where a size relationship between a sum of G pixel values and a sum of R pixel values of the pixels arranged in the one direction that are calculated by the total pixel value calculating process is opposite to a size relationship between a sum of G pixel values and a sum of R pixel values of the pixels arranged in the other direction that are calculated by the total pixel value calculating process, or in a case where a size relationship between the sum of the G pixel values and a sum of B pixel values of the pixels arranged in the one direction is opposite to a size relationship between the sum of the G pixel values and a sum of B pixel values of the pixels arranged in the other direction.

The configuration described above allows detection of at least one of a nearly saturated area and an area other than the nearly saturated area as the axial chromatic aberration occurrence start point.

In the aspect described above, the occurrence start point detecting process may determine that the pixel of interest is the axial chromatic aberration occurrence start point in a case where following conditional expressions are satisfied:

$$Pg_{D1} > Pr_{D1}$$

$$Pg_{D2} < Pr_{D2}$$

where $Pg_{D1}$ represents the sum of the G pixel values of the pixels arranged from the pixel of interest in the one direction, $Pg_{D2}$ represents the sum of the G pixel values of the pixels arranged from the pixel of interest in the other direction, $Pr_{D1}$ represents the sum of the R pixel values of the pixels arranged from the pixel of interest in the one direction, and $Pr_{D2}$ represents the sum of the R pixel values of the pixels arranged from the pixel of interest in the other direction.

The configuration described above allows detection of an axial chromatic aberration occurrence start point in the vicinity of the focus position.

In the aspect described above, the occurrence start point detecting process may determine that the pixel of interest is the axial chromatic aberration occurrence start point in a case where following conditional expressions are satisfied:

$$Pg_{D1} > Pb_{D1}$$

$$Pg_{D2} < Pb_{D2}$$

where $Pg_{D1}$ represents the sum of the G pixel values of the pixels arranged from the pixel of interest in the one direction, $Pg_{D2}$ represents the sum of the G pixel values of the pixels arranged from the pixel of interest in the other direction, $Pb_{D1}$ represents the sum of the B pixel values of the pixels arranged from the pixel of interest in the one direction, and $Pb_{D2}$ represents the sum of the B pixel values of the pixels arranged from the pixel of interest in the other direction.

The configuration described above also allows detection of an axial chromatic aberration occurrence start point in the vicinity of the focus position.

In the aspect described above, the occurrence start point detecting process may determine that the pixel of interest is the axial chromatic aberration occurrence start point in a case where following conditional expressions are satisfied:

$$Pg_{D1} > Pr_{D1}$$

$$Pg_{D2} < Pr_{D2}$$

$$Pg_{D2} < Pb_{D2}$$

where $Pg_{D1}$ represents the sum of the G pixel values of the pixels arranged from the pixel of interest in the one direction, $Pg_{D2}$ represents the sum of the G pixel values of the pixels arranged from the pixel of interest in the other direction, $Pr_{D1}$ represents the sum of the R pixel values of the pixels arranged from the pixel of interest in the one direction, $Pr_{D2}$ represents the sum of the R pixel values of the pixels arranged from the pixel of interest in the other direction, and $Pb_{D2}$ represents the sum of the B pixel values of the pixels arranged from the pixel of interest in the other direction.

The configuration described above allows a location where a purple fringe occurs in the other direction and the sum of the R pixel values is smaller than the sum of the G pixel values in the one direction so that a color close to the color opposite purple in the hue circle is produced and therefore makes the purple fringe highly visible to be detected as the axial chromatic aberration occurrence start point.

In the aspect described above, the occurrence start point detecting process may determine that the pixel of interest is the axial chromatic aberration occurrence start point in a case where following conditional expressions are satisfied:

$$Pg_{D1} > Pb_{D1}$$

$$Pg_{D2} < Pr_{D2}$$

$$Pg_{D2} < Pb_{D2}$$

where $Pg_{D1}$ represents the sum of the G pixel values of the pixels arranged from the pixel of interest in the one direction, $Pg_{D2}$ represents the sum of the G pixel values of the pixels arranged from the pixel of interest in the other direction, $Pr_{D2}$ represents the sum of the R pixel values of the pixels arranged from the pixel of interest in the other direction, $Pb_{D1}$ represents the sum of the B pixel values of the pixels arranged from the pixel of interest in the one direction, and $Pb_{D2}$ represents the sum of the B pixel values of the pixels arranged from the pixel of interest in the other direction.

The configuration described above also allows a location where a purple fringe occurs in the other direction and the sum of the B pixel values is smaller than the sum of the G pixel values in the one direction so that a color close to the color opposite purple in the hue circle is produced and therefore makes the purple fringe highly visible to be detected as the axial chromatic aberration occurrence start point.

In the aspect described above, the occurrence start point detecting process may determine that the pixel of interest is the axial chromatic aberration occurrence start point in a case where following conditional expressions are satisfied:

$$Pg_{D1} > Pr_{D1}$$

$$Pg_{D1} > Pb_{D1}$$

$$Pg_{D2} < Pr_{D2}$$

where $Pg_{D1}$ represents the sum of the G pixel values of the pixels arranged from the pixel of interest in the one direction, $Pg_{D2}$ represents the sum of the G pixel values of the pixels arranged from the pixel of interest in the other direction, $Pr_{D1}$ represents the sum of the R pixel values of the pixels arranged from the pixel of interest in the one direction, $Pr_{D2}$ represents the sum of the R pixel values of the pixels arranged from the pixel of interest in the other direction, and $Pb_{D1}$ represents the sum of the B pixel values of the pixels arranged from the pixel of interest in the one direction.

The configuration described above allows a location where a green fringe occurs in the one direction and the sum of the R pixel values is greater than the sum of the G pixel values in the other direction so that a color close to the color opposite green in the hue circle is produced and therefore makes the green fringe highly visible to be detected as the axial chromatic aberration occurrence start point.

In the aspect described above, the occurrence start point detecting process may determine that the pixel of interest is the axial chromatic aberration occurrence start point in a case where following conditional expressions are satisfied:

$$Pg_{D1} > Pr_{D1}$$

$$Pg_{D1} > Pb_{D1}$$

$$Pg_{D2} < Pb_{D2}$$

where $Pg_{D1}$ represents the sum of the G pixel values of the pixels arranged from the pixel of interest in the one direction, $Pg_{D2}$ represents the sum of the G pixel values of the pixels arranged from the pixel of interest in the other direction, $Pr_{D1}$ represents the sum of the R pixel values of the pixels arranged from the pixel of interest in the one direction, $Pb_{D1}$ represents the sum of the B pixel values of the pixels arranged from the pixel of interest in the one direction, and $Pb_{D2}$ represents the sum of the B pixel values of the pixels arranged from the pixel of interest in the other direction.

The configuration described above also allows a location where a green fringe occurs in the one direction and the sum of the B pixel values is greater than the sum of the G pixel values in the other direction so that a color close to the color opposite green in the hue circle is produced and therefore makes the green fringe highly visible to be detected as the axial chromatic aberration occurrence start point.

In the aspect described above, the occurrence start point detecting process may determine that the pixel of interest is the axial chromatic aberration occurrence start point in a case where following conditional expressions are satisfied:

$$Pg_{D1}+TH_{R1}>Pr_{D1}$$

$$Pg_{D2}-TH_{R2}<Pr_{D2}$$

$$Pg_{D1}+TH_{B1}>Pb_{D1}$$

$$Pg_{D2}-TH_{B2}<Pr_{D2}$$

where $Pg_{D1}$ represents the sum of the G pixel values of the pixels arranged from the pixel of interest in the one direction, $Pg_{D2}$ represents the sum of the G pixel values of the pixels arranged from the pixel of interest in the other direction, $Pr_{D1}$ represents the sum of the R pixel values of the pixels arranged from the pixel of interest in the one direction, $Pr_{D2}$ represents the sum of the R pixel values of the pixels arranged from the pixel of interest in the other direction, $Pb_{D1}$ represents the sum of the B pixel values of the pixels arranged from the pixel of interest in the one direction, $Pb_{D2}$ represents the sum of the B pixel values of the pixels arranged from the pixel of interest in the other direction, and $TH_{R1}$, $TH_{R2}$, $TH_{B1}$, and $TH_{B2}$ are each an arbitrary constant.

In the configuration described above, appropriately selecting $TH_{R1}$, $TH_{R2}$, $TH_{B1}$, and $TH_{B2}$ allows reduction in influence of noise, whereby the axial chromatic aberration occurrence start point can be stably detected.

In the aspect described above, the occurrence start point detecting process may determine that the pixel of interest is the axial chromatic aberration occurrence start point in a case where following conditional expressions are satisfied:

$$Pg_{D1}+TH_R>Pr_{D1}$$

$$Pg_{D2}+TH_R<Pr_{D2}$$

$$Pg_{D1}+TH_B>Pb_{D1}$$

$$Pg_{D2}+TH_B<Pb_{D2}$$

where $Pg_{D1}$ represents the sum of the G pixel values of the pixels arranged from the pixel of interest in the one direction, $Pg_{D2}$ represents the sum of the G pixel values of the pixels arranged from the pixel of interest in the other direction, $Pr_{D1}$ represents the sum of the R pixel values of the pixels arranged from the pixel of interest in the one direction, $Pr_{D2}$ represents the sum of the R pixel values of the pixels arranged from the pixel of interest in the other direction, $Pb_{D1}$ represents the sum of the B pixel values of the pixels arranged from the pixel of interest in the one direction, $Pb_{D2}$ represents the sum of the B pixel values of the pixels arranged from the pixel of interest in the other direction, and $TH_R$ and $TH_B$ are each an arbitrary constant.

In the configuration described above, appropriately selecting $TH_R$ and $TH_B$ allows detection of an axial chromatic aberration occurrence start point that occurs on a colored subject instead of an achromatic subject.

In the aspect described above, the occurrence start point detecting process may determine that the pixel of interest is the axial chromatic aberration occurrence start point in a case where following conditional expressions are satisfied:

$$Pg_{D1}>Pr_{D1}\times K_R$$

$$Pg_{D2}<Pr_{D2}\times K_R$$

$$Pg_{D1}>Pb_{D1}\times K_B$$

$$Pg_{D2}<Pb_{D2}\times K_B$$

where $Pg_{D1}$ represents the sum of the G pixel values of the pixels arranged from the pixel of interest in the one direction, $Pg_{D2}$ represents the sum of the G pixel values of the pixels arranged from the pixel of interest in the other direction, $Pr_{D1}$ represents the sum of the R pixel values of the pixels arranged from the pixel of interest in the one direction, $Pr_{D2}$ represents the sum of the R pixel values of the pixels arranged from the pixel of interest in the other direction, $Pb_{D1}$ represents the sum of the B pixel values of the pixels arranged from the pixel of interest in the one direction, $Pb_{D2}$ represents the sum of the B pixel values of the pixels arranged from the pixel of interest in the other direction, and $K_R$ and $K_B$ are each an arbitrary constant.

In the configuration described above, appropriately selecting $K_R$ and $K_B$ allows detection of an axial chromatic aberration occurrence start point that occurs on a colored subject instead of an achromatic subject.

In the aspect described above, the image may have all RGB pixel values at each pixel.

The configuration described above allows processing to detect an axial chromatic aberration occurrence start point even in a synchronized image in which all RGB pixel values are simultaneously acquired at each pixel.

In the aspect described above, the image may have pixel values missing at least one pixel value out of RGB at each pixel.

The configuration described above allows detection of the axial chromatic aberration occurrence start point even in a non-synchronized image in which all RGB pixel values are not simultaneously acquired at each pixel, whereby influence of an error in interpolation for the synchronization at the time of detection of the axial chromatic aberration occurrence start point can be eliminated.

Another aspect of the present invention relates to an image processing method including a total pixel value calculating step of summing pixel values of pixels, out of a plurality of pixels containing a pixel of interest in an input image and arranged in one line, arranged in one direction and another direction on opposite sides of the pixel of interest on a color basis, an occurrence start point detecting step of detecting the pixel of interest as an axial chromatic aberration occurrence start point based on at least one of a result of the calculation performed in the total pixel value calculating step and the pixel value of the pixel of interest, an area determining step of determining a predetermined surrounding area around the pixel of interest detected as the occurrence start point to be an axial chromatic aberration area, a color space information calculating step of calculating color space information on the pixel of interest detected as the occurrence start point in a specific color space for the one direction and the other direction based on the result of the calculation performed in the total pixel value calculating step, a color space difference calculating step of calculating a difference between the color space information for the one direction and the color space information for the other direction calculated in the color space information calculating step, a correction amount calculating step of calculating a amount of correction of axial chromatic aberration in accordance with the difference calculated in the color space difference calculating step, and a correcting step of correcting the axial chromatic aberration area by using the correction amount.

In the other aspect described above, in the color space information calculating step, at least one of information on color angle, information on color strength, and information on color lightness may be calculated as the color space information in the specific color space, in the color space difference calculating step, at least one of a difference in the color angle, a difference in the color strength, and a difference in the color lightness may be calculated as the difference between the color space information for the one direction and the color space information for the other direction based on the result of the calculation performed in the color space information calculating step, and in the correction amount calculating step, the amount of correction of the axial chromatic aberration may be calculated based on a result of the calculation performed in the color space difference calculating step.

In the other aspect described above, in the occurrence start point detecting step, the pixel of interest may be detected as the axial chromatic aberration occurrence start point in a case where the pixel value of the pixel of interest is greater than a predetermined threshold, or in a case where a size relationship between a sum of G pixel values and a sum of R pixel values of the pixels arranged in the one direction that are calculated by the total pixel value calculating step is opposite to a size relationship between a sum of G pixel values and a sum of R pixel values of the pixels arranged in the other direction that are calculated by the total pixel value calculating step, or in a case where a size relationship between the sum of the G pixel values and a sum of B pixel values of the pixels arranged in the one direction is opposite to a size relationship between the sum of the G pixel values and a sum of B pixel values of the pixels arranged in the other direction.

Another aspect of the present invention relates to an image processing program product non-transitory computer readable program medium, and an image processing program stored in the non-transitory computer readable medium, wherein the image processing program that causes a computer to carry out a total pixel value calculating step of summing pixel values of pixels, out of a plurality of pixels containing a pixel of interest in an input image and arranged in one line, arranged in one direction and another direction on opposite sides of the pixel of interest on a color basis, an occurrence start point detecting step of detecting the pixel of interest as an axial chromatic aberration occurrence start point based on at least one of a result of the calculation performed in the total pixel value calculating step and the pixel value of the pixel of interest, an area determining step of determining a predetermined surrounding area around the pixel of interest detected as the occurrence start point to be an axial chromatic aberration area, a color space information calculating step of calculating color space information on the pixel of interest detected as the occurrence start point in a specific color space for the one direction and the other direction based on the result of the calculation performed in the total pixel value calculating step, a color space difference calculating step of calculating a difference between the color space information for the one direction and the color space information for the other direction calculated in the color space information calculating step, a correction amount calculating step of calculating a amount of correction of axial chromatic aberration in accordance with the difference calculated in the color space difference calculating step, and a correcting step of correcting the axial chromatic aberration area by using the correction amount.

In the other aspect described above, in the color space information calculating step, the computer may calculate at least one of information on color angle, information on color strength, and information on color lightness as the color space information in the specific color space, in the color space difference calculating step, the computer may calculate at least one of a difference in the color angle, a difference in the color strength, and a difference in the color lightness as the difference between the color space information for the one direction and the color space information for the other direction based on the result of the calculation performed in the color space information calculating step, and in the correction amount calculating step, the computer may calculate the amount of correction of the axial chromatic aberration based on a result of the calculation performed in the color space difference calculating step.

In the other aspect described above, in the occurrence start point detecting step, the computer may detect the pixel of interest as the axial chromatic aberration occurrence start point in a case where the pixel value of the pixel of interest is greater than a predetermined threshold, or in a case where a size relationship between a sum of G pixel values and a sum of R pixel values of the pixels arranged in the one direction that are calculated by the total pixel value calculating step is opposite to a size relationship between a sum of G pixel values and a sum of R pixel values of the pixels arranged in the other direction that are calculated by the total pixel value calculating step, or in a case where a size relationship between the sum of the G pixel values and a sum of B pixel values of the pixels arranged in the one direction is opposite to a size relationship between the sum of the G pixel values and a sum of B pixel values of the pixels arranged in the other direction.

The image processing apparatus and the like according to the present embodiment may include a processor and a memory. The functions of individual units in the processor may be implemented by respective pieces of hardware or may be implemented by an integrated piece of hardware, for example. The processor may include hardware, and the hardware may include at least one of a circuit for processing digital signals and a circuit for processing analog signals, for example. The processor may include one or a plurality of circuit devices (e.g., an IC) or one or a plurality of circuit elements (e.g., a resistor, a capacitor) on a circuit board, for example. The processor may be a CPU (Central Processing Unit), for example, but this should not be construed in a limiting sense, and various types of processors including a GPU (Graphics Processing Unit) and a DSP (Digital Signal Processor) may be used. The processor may be a hardware circuit with an ASIC. The processor may include an amplification circuit, a filter circuit, or the like for processing analog signals. The memory may be a semiconductor memory such as an SRAM and a DRAM; a register; a magnetic storage device such as a hard disk device; and an optical storage device such as an optical disk device. The memory stores computer-readable instructions, for example. When the instructions are executed by the processor, the functions of each unit of the image processing apparatus and the like are implemented. The instructions may be a set of instructions constituting a program or an instruction for causing an operation on the hardware circuit of the processor.

The first and second embodiments, to which the present invention is applied, and modifications thereof have been described above. This should not be construed in a limiting sense however, and the present invention can be embodied with some components modified without departing from the scope of the present invention. Various inventions can be devised by combining a plurality of components disclosed in the first and second embodiments and the modifications thereof as appropriate. For example, some of the components described in the first and second embodiments and the modifications thereof may be omitted. In addition, components recited in different embodiments or modifications may be combined as appropriate. Terms that are accompanied by a broader term or a similar term at least once in the specification or the drawings can be replaced with such a term in any other part of the specification or the drawings. In this sense, various modifications and changes can be made without departing from the spirit of the present invention.

REFERENCE SIGNS LIST

2 Area extracting section
3 Axial chromatic aberration correction amount calculating section
4 Aberration correcting section 10 total pixel value calculating section 11 Occurrence start point detecting section
12 Area determining section
15 Color space information calculating section
16 Color space difference calculating section
17 Correction amount calculating section

The invention claimed is:

1. An image processing apparatus comprising a processor comprising hardware,
the processor being configured to implement:
a total pixel value calculating process that sums pixel values of a plurality of pixels arranged in one line including a pixel of interest of an input image, such that the pixel values of pixels are summed by each color for pixels arranged in one direction and other direction on opposite sides of the pixel of interest;
an occurrence start point detecting process that determines whether or not the pixel of interest is an axial chromatic aberration occurrence start point based on at least one of a result of the calculation performed by the total pixel value calculating process and the pixel value of the pixel of interest and detects the occurrence start point;
an area determining process that determines a predetermined surrounding area around the pixel of interest detected as the occurrence start point to be an axial chromatic aberration area;
a color space information calculating process that calculates color space information on the pixel of interest detected as the occurrence start point in a specific color space for the one direction and the other direction based on the result of the calculation performed by the total pixel value calculating process;
a color space difference calculating process that calculates a difference between the color space information for the one direction and the color space information for the other direction calculated by the color space information calculating process;
a correction amount calculating process that calculates an amount of correction of axial chromatic aberration in accordance with the difference calculated by the color space difference calculating process; and
a correcting process that corrects the axial chromatic aberration area by using the correction amount.

2. The image processing apparatus according to claim 1, wherein:
in the color space information calculating process, at least one of information on color angle, information on color strength, and information on color lightness is calculated as the color space information in the specific color space,
in the color space difference calculating process, at least one of a difference in the color angle, a difference in the color strength, and a difference in the color lightness is calculated as the difference between the color space information of the one direction and the color space information of the other direction based on the result of the calculation performed by the color space information calculating process, and
in the correction amount calculating process, the amount of correction of the axial chromatic aberration is calculated based on a result of the calculation performed in the color space difference calculating process.

3. The image processing apparatus according to claim 1, wherein in the occurrence start point detecting process, the pixel of interest is detected as the axial chromatic aberration occurrence start point in a case where the pixel value of the pixel of interest is greater than a predetermined threshold, or in a case where a size relationship between a sum of G pixel values and a sum of R pixel values of the pixels arranged in the one direction that are calculated by the total pixel value calculating process is opposite to a size relationship between a sum of G pixel values and a sum of R pixel values of the pixels arranged in the other direction that are calculated by the total pixel value calculating process, or in a case where a size relationship between the sum of the G pixel values and a sum of B pixel values of the pixels arranged in the one direction is opposite to a size relationship between the sum of the G pixel values and a sum of B pixel values of the pixels arranged in the other direction.

4. The image processing apparatus according to claim 1, wherein in the occurrence start point detecting process, that the pixel of interest is determined as the axial chromatic aberration occurrence start point in a case where following conditional expressions are satisfied:

$$Pg_{D1} > Pr_{D1}$$

$$Pg_{D2} < Pr_{D2}$$

where $Pg_{D1}$ represents the sum of the G pixel values of the pixels arranged from the pixel of interest in the one direction, $Pg_{D2}$ represents the sum of the G pixel values of the pixels arranged from the pixel of interest in the other direction, $Pr_{D1}$ represents the sum of the R pixel values of the pixels arranged from the pixel of interest in the one direction, and $Pr_{D2}$ represents the sum of the R pixel values of the pixels arranged from the pixel of interest in the other direction.

5. The image processing apparatus according to claim 1, wherein in the occurrence start point detecting process, the pixel of interest is determined as the axial chromatic aberration occurrence start point in a case where following conditional expressions are satisfied:

$$Pg_{D1} > Pb_{D1}$$

$$Pg_{D2} < Pb_{D2}$$

where $Pg_{D1}$ represents the sum of the G pixel values of the pixels arranged from the pixel of interest in the one direction, $Pg_{D2}$ represents the sum of the G pixel values of the pixels arranged from the pixel of interest in the other direction, $Pb_{D1}$ represents the sum of the B pixel values of the pixels arranged from the pixel of interest in the one direction, and $Pb_{D2}$ represents the sum of the B pixel values of the pixels arranged from the pixel of interest in the other direction.

6. The image processing apparatus according to claim 1, wherein in the occurrence start point detecting process, the pixel of interest is determined as the axial chromatic aberration occurrence start point in a case where following conditional expressions are satisfied:

$$Pg_{D1} > Pr_{D1}$$

$$Pg_{D2} < Pr_{D2}$$

$$Pg_{D2} < Pb_{D2}$$

where $Pg_{D1}$ represents the sum of the G pixel values of the pixels arranged from the pixel of interest in the one direction, $Pg_{D2}$ represents the sum of the G pixel values of the pixels arranged from the pixel of interest in the other direction, $Pr_{D1}$ represents the sum of the R pixel values of the pixels arranged from the pixel of interest in the one direction, $Pr_{D2}$ represents the sum of the R pixel values of the pixels arranged from the pixel of interest in the other direction, and $Pb_{D2}$ represents the sum of the B pixel values of the pixels arranged from the pixel of interest in the other direction.

7. The image processing apparatus according to claim 1, wherein in the occurrence start point detecting process, the pixel of interest is determined as the axial chromatic aberration occurrence start point in a case where following conditional expressions are satisfied:

$$Pg_{D1} > Pb_{D1}$$

$$Pg_{D2} < Pr_{D2}$$

$$Pg_{D2} < Pb_{D2}$$

where $Pg_{D1}$ represents the sum of the G pixel values of the pixels arranged from the pixel of interest in the one direction, $Pg_{D2}$ represents the sum of the G pixel values of the pixels arranged from the pixel of interest in the other direction, $Pr_{D2}$ represents the sum of the R pixel values of the pixels arranged from the pixel of interest in the other direction, $Pb_{D1}$ represents the sum of the B pixel values of the pixels arranged from the pixel of interest in the one direction, and $Pb_{D2}$ represents the sum of the B pixel values of the pixels arranged from the pixel of interest in the other direction.

8. The image processing apparatus according to claim 1, wherein in the occurrence start point detecting process, the pixel of interest is determined as the axial chromatic aberration occurrence start point in a case where following conditional expressions are satisfied:

$$Pg_{D1} > Pr_{D1}$$

$$Pg_{D1} > Pb_{D1}$$

$$Pg_{D2} < Pr_{D2}$$

where $Pg_{D1}$ represents the sum of the G pixel values of the pixels arranged from the pixel of interest in the one direction, $Pg_{D2}$ represents the sum of the G pixel values of the pixels arranged from the pixel of interest in the other direction, $Pr_{D1}$ represents the sum of the R pixel values of the pixels arranged from the pixel of interest in the one direction, $Pr_{D2}$ represents the sum of the R pixel values of the pixels arranged from the pixel of interest in the other direction, and $Pb_{D1}$ represents the sum of the B pixel values of the pixels arranged from the pixel of interest in the one direction.

9. The image processing apparatus according to claim 1, wherein in the occurrence start point detecting process, the pixel of interest is determined as the axial chromatic aberration occurrence start point in a case where following conditional expressions are satisfied:

$$Pg_{D1} > Pr_{D1}$$

$$Pg_{D1} > Pb_{D1}$$

$$Pg_{D2} < Pb_{D2}$$

where $Pg_{D1}$ represents the sum of the G pixel values of the pixels arranged from the pixel of interest in the one direction, $Pg_{D2}$ represents the sum of the G pixel values of the pixels arranged from the pixel of interest in the other direction, $Pr_{D1}$ represents the sum of the R pixel values of the pixels arranged from the pixel of interest in the one direction, $Pb_{D1}$ represents the sum of the B pixel values of the pixels arranged from the pixel of interest in the one direction, and $Pb_{D2}$ represents the sum of the B pixel values of the pixels arranged from the pixel of interest in the other direction.

10. The image processing apparatus according to claim 1, wherein in the occurrence start point detecting process, the pixel of interest is determined as the axial chromatic aberration occurrence start point in a case where following conditional expressions are satisfied:

$$Pg_{D1} + TH_{R1} > Pr_{D1}$$

$$Pg_{D2} - TH_{R2} < Pr_{D2}$$

$$Pg_{D1} + TH_{B1} > Pb_{D1}$$

$$Pg_{D2} - TH_{B2} < Pr_{D2}$$

where $Pg_{D1}$ represents the sum of the G pixel values of the pixels arranged from the pixel of interest in the one direction, $Pg_{D2}$ represents the sum of the G pixel values of the pixels arranged from the pixel of interest in the other direction, $Pr_{D1}$ represents the sum of the R pixel values of the pixels arranged from the pixel of interest in the one direction, $Pr_{D2}$ represents the sum of the R pixel values of the pixels arranged from the pixel of interest in the other direction, $Pb_{D1}$ represents the sum of the B pixel values of the pixels arranged from the pixel of interest in the one direction, $Pb_{D2}$ represents the sum of the B pixel values of the pixels arranged from the pixel of interest in the other direction, and $TH_{R1}$, $TH_{R2}$, $TH_{B1}$, and $TH_{B2}$ are each an arbitrary constant.

11. The image processing apparatus according to claim 1, wherein in the occurrence start point detecting process, the pixel of interest is determined as the axial chromatic aberration occurrence start point in a case where following conditional expressions are satisfied:

$$Pg_{D1} + TH_R > Pr_{D1}$$

$$Pg_{D2} + TH_R < Pr_{D2}$$

$$Pg_{D1} + TH_B > Pb_{D1}$$

$$Pg_{D2} + TH_B < Pb_{D2}$$

where $Pg_{D1}$ represents the sum of the G pixel values of the pixels arranged from the pixel of interest in the one direction, $Pg_{D2}$ represents the sum of the G pixel values of the pixels arranged from the pixel of interest in the other direction, $Pr_{D1}$ represents the sum of the R pixel values of the pixels arranged from the pixel of interest in the one direction, $Pr_{D2}$ represents the sum of the R pixel values of the pixels arranged from the pixel of interest in the other direction, $Pb_{D1}$ represents the sum of the B pixel values of the pixels arranged from the pixel of interest in the one direction, $Pb_{D2}$ represents the sum of the B pixel values of the pixels arranged from the pixel of interest in the other direction, and $TH_R$ and $TH_B$ are each an arbitrary constant.

12. The image processing apparatus according to claim 1, wherein in the occurrence start point detecting process, the pixel of interest is determined as the axial chromatic aberration occurrence start point in a case where following conditional expressions are satisfied:

$$Pg_{D1} > Pr_{D1} \times K_R$$

$$Pg_{D2} < Pr_{D2} \times K_R$$

$$Pg_{D1} > Pb_{D1} \times K_B$$

$$Pg_{D2} < Pb_{D2} \times K_B$$

where $Pg_{D1}$ represents the sum of the G pixel values of the pixels arranged from the pixel of interest in the one direction, $Pg_{D2}$ represents the sum of the G pixel values of the pixels arranged from the pixel of interest in the other direction, $Pr_{D1}$ represents the sum of the R pixel values of the pixels arranged from the pixel of interest in the one direction, $Pr_{D2}$ represents the sum of the R pixel values of the pixels arranged from the pixel of interest in the other direction, $Pb_{D1}$ represents the sum of the B pixel values of the pixels arranged from the pixel of interest in the one direction, $Pb_{D2}$ represents the sum of the B pixel values of the pixels arranged from the pixel of interest in the other direction, and $K_R$ and $K_B$ are each an arbitrary constant.

13. The image processing apparatus according to claim 1, wherein the image has all RGB pixel values at each pixel.

14. The image processing apparatus according to claim 1, wherein the image has pixel values missing at least one pixel value out of RGB at each pixel.

15. An image processing method comprising:
a total pixel value calculating step of summing pixel values of a plurality of pixels arranged in one line including a pixel of interest in an input image, such that the pixel values of pixels are summed by each color for pixels arranged in one direction and other direction on opposite sides of the pixel of interest;
an occurrence start point detecting step of detecting the pixel of interest as an axial chromatic aberration occurrence start point based on at least one of a result of the calculation performed in the total pixel value calculating step and the pixel value of the pixel of interest;
an area determining step of determining a predetermined surrounding area around the pixel of interest detected as the occurrence start point to be an axial chromatic aberration area;
a color space information calculating step of calculating color space information on the pixel of interest detected as the occurrence start point in a specific color space for the one direction and the other direction based on the result of the calculation performed in the total pixel value calculating step;
a color space difference calculating step of calculating a difference between the color space information for the one direction and the color space information for the other direction calculated in the color space information calculating step;
a correction amount calculating step of calculating an amount of correction of axial chromatic aberration in accordance with the difference calculated in the color space difference calculating step; and
a correcting step of correcting the axial chromatic aberration area by using the correction amount.

16. The image processing method according to claim 15, wherein:
in the color space information calculating step, at least one of information on color angle, information on color strength, and information on color lightness is calculated as the color space information in the specific color space,
in the color space difference calculating step, at least one of a difference in the color angle, a difference in the color strength, and a difference in the color lightness is calculated as the difference between the color space information of the one direction and the color space information of the other direction based on the result of the calculation performed in the color space information calculating step, and
in the correction amount calculating step, the amount of correction of the axial chromatic aberration is calculated based on a result of the calculation performed in the color space difference calculating step.

17. The image processing method according to claim 15, wherein in the occurrence start point detecting step, the pixel of interest is detected as the axial chromatic aberration occurrence start point in a case where the pixel value of the pixel of interest is greater than a predetermined threshold, or in a case where a size relationship between a sum of G pixel values and a sum of R pixel values of the pixels arranged in the one direction that are calculated by the total pixel value calculating step is opposite to a size relationship between a sum of G pixel values and a sum of R pixel values of the pixels arranged in the other direction that are calculated by the total pixel value calculating step, or in a case where a size relationship between the sum of the G pixel values and a sum of B pixel values of the pixels arranged in the one direction is opposite to a size relationship between the sum of the G pixel values and a sum of B pixel values of the pixels arranged in the other direction.

18. An image processing program product comprising:
a non-transitory computer readable program medium; and
an image processing program stored in the non-transitory computer readable medium, wherein the image processing program that causes a computer to carry out:
a total pixel value calculating step of summing pixel values of of a plurality of pixels arranged in one line including a pixel of interest of an input image, such that the pixel values of pixels are summed by each color for pixels arranged in one direction and other direction on opposite sides of the pixel of interest;
an occurrence start point detecting step of detecting the pixel of interest as an axial chromatic aberration occurrence start point based on at least one of a result of the calculation performed in the total pixel value calculating step and the pixel value of the pixel of interest;
an area determining step of determining a predetermined surrounding area around the pixel of interest detected as the occurrence start point to be an axial chromatic aberration area;
a color space information calculating step of calculating color space information on the pixel of interest detected as the occurrence start point in a specific color space for the one direction and the other direction based on the result of the calculation performed in the total pixel value calculating step;

a color space difference calculating step of calculating a difference between the color space information for the one direction and the color space information for the other direction calculated in the color space information calculating step;

a correction amount calculating step of calculating an amount of correction of axial chromatic aberration in accordance with the difference calculated in the color space difference calculating step; and a correcting step of correcting the axial chromatic aberration area by using the correction amount.

19. The image processing program product according to claim 18, wherein the computer:

in the color space information calculating step, calculates at least one of information on color angle, information on color strength, and information on color lightness as the color space information in the specific color space, in the color space difference calculating step, calculates at least one of a difference in the color angle, a difference in the color strength, and a difference in the color lightness as the difference between the color space information of the one direction and the color space information of the other direction based on the result of the calculation performed in the color space information calculating step, and in the correction amount calculating step, calculates the amount of correction of the axial chromatic aberration based on a result of the calculation performed in the color space difference calculating step.

20. The image processing program product according to claim 17, wherein the computer:

in the occurrence start point detecting step, detects the pixel of interest as the axial chromatic aberration occurrence start point in a case where the pixel value of the pixel of interest is greater than a predetermined threshold, or in a case where a size relationship between a sum of G pixel values and a sum of R pixel values of the pixels arranged in the one direction that are calculated by the total pixel value calculating step is opposite to a size relationship between a sum of G pixel values and a sum of R pixel values of the pixels arranged in the other direction that are calculated by the total pixel value calculating step, or in a case where a size relationship between the sum of the G pixel values and a sum of B pixel values of the pixels arranged in the one direction is opposite to a size relationship between the sum of the G pixel values and a sum of B pixel values of the pixels arranged in the other direction.

* * * * *